(12) United States Patent
Lee

(10) Patent No.: US 10,631,302 B2
(45) Date of Patent: Apr. 21, 2020

(54) LIMITING DATA TRANSMISSION UNDER LOSSY WIRELESS CONDITIONS OF AN INTERNET OF THINGS WIRELESS DEVICE TO FACILITATE A REDUCTION OF WIRELESS RETRANSMISSIONS OF THE DATA

(71) Applicant: AT&T INTELLECTUAL PROPERTY I, L.P., Atlanta, GA (US)

(72) Inventor: Craig Allen Lee, Frisco, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 291 days.

(21) Appl. No.: 15/635,115

(22) Filed: Jun. 27, 2017

(65) Prior Publication Data
US 2018/0376483 A1 Dec. 27, 2018

(51) Int. Cl.
*H04W 72/08* (2009.01)
*H04W 72/10* (2009.01)

(52) U.S. Cl.
CPC ............ *H04W 72/08* (2013.01); *H04W 72/10* (2013.01)

(58) Field of Classification Search
None
See application file for complete search history.

(56) References Cited

U.S. PATENT DOCUMENTS

| | | | | |
|---|---|---|---|---|
| 6,539,205 B1 * | 3/2003 | Wan | ...................... | H04L 1/0002 370/209 |
| 6,591,382 B1 * | 7/2003 | Molloy | ................. | H04L 1/0009 714/704 |
| 8,971,903 B2 | 3/2015 | Hossain et al. | | |
| 9,037,178 B1 | 5/2015 | Grochla et al. | | |
| 9,106,519 B1 | 8/2015 | Ray et al. | | |
| 9,219,670 B2 | 12/2015 | Aluru et al. | | |
| 9,439,166 B2 | 9/2016 | Siomina et al. | | |
| 9,538,413 B2 | 1/2017 | Chou et al. | | |
| 9,544,907 B2 | 1/2017 | Egner et al. | | |
| 9,585,124 B2 | 2/2017 | Diener et al. | | |
| 9,635,589 B2 | 4/2017 | Singh et al. | | |
| 2008/0239953 A1 | 10/2008 | Bai et al. | | |
| 2015/0358839 A1 | 12/2015 | Olgaard et al. | | |
| 2016/0050589 A1 | 2/2016 | Safavi | | |
| 2016/0252945 A1 * | 9/2016 | Ou | ....................... | G06F 1/3209 713/320 |

* cited by examiner

*Primary Examiner* — Alex Skripnikov
(74) *Attorney, Agent, or Firm* — Amin, Turocy & Watson, LLP

(57) ABSTRACT

Limiting data transmission under lossy wireless conditions of an Internet of Things (IoT) wireless device to facilitate a reduction of wireless retransmissions of such data is presented herein. A method can comprise determining a characteristic of a radio frequency channel wirelessly coupling a wireless device to an access point device that has been configured to transfer data, which has been received from the wireless device, to a host device; and in response to the characteristic of the radio frequency channel being determined to satisfy a defined condition representing a degradation of a fidelity of the radio frequency channel, modifying, based on a determined classification of outbound data of the data that has been directed to the host device, a transmission of the outbound data to facilitate a reduction in wireless retransmissions of the outbound data due to the degradation of the fidelity of the radio frequency channel.

20 Claims, 16 Drawing Sheets

LIMITING DATA TRANSMISSION UNDER LOSSY WIRELESS CONDITIONS OF AN INTERNET OF THINGS WIRELESS DEVICE TO FACILITATE A REDUCTION OF WIRELESS RETRANSMISSIONS OF THE DATA

TECHNICAL FIELD

The subject disclosure generally relates to embodiments for limiting data transmission under lossy wireless conditions of an Internet of Things (IoT) wireless device to facilitate a reduction of wireless retransmissions of the data.

BACKGROUND

Wireless connectivity of Internet of Things (IoT)/Machine-to-Machine (M2M) devices often correspond to lossy, error-prone radio/radio frequency (RF) link conditions. In this regard, conventional wireless technologies, e.g., cellular, satellite, etc. utilize transmission control protocol (TCP) based error mediation elements, e.g., error detection, out-of-order packet detection, lost packet detection, forced use of acknowledge (ACK)/negative acknowledgement (NAK) packets/signals, etc. to ensure data is received at a destination device with little/no errors. However, retransmission of data by such TCP based error mediation elements incurs incremental monetary costs that are metered, billed, etc., e.g., via subscription based cellular, satellite, etc. services, according to an amount of data that has been transferred over a radio/RF link. Consequently, conventional wireless technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
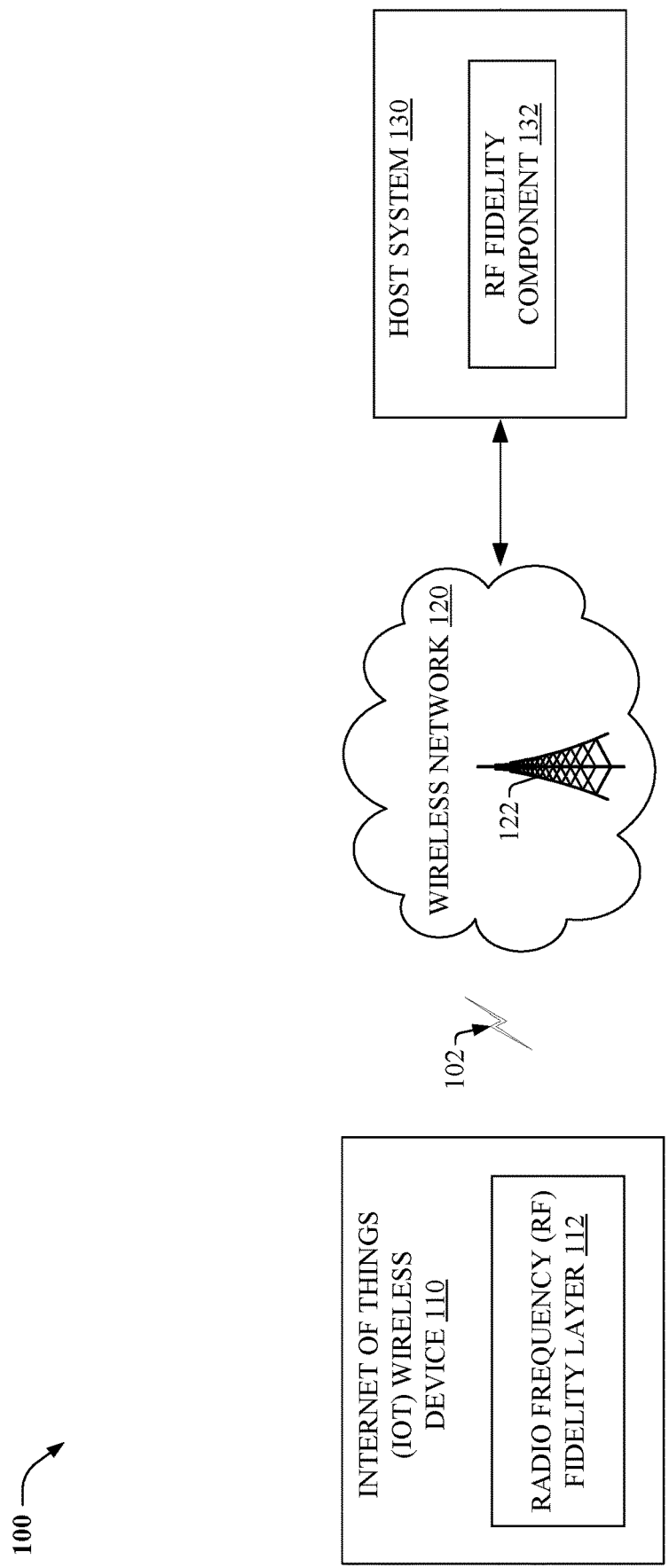
FIG. 1 illustrates a block diagram of an IoT wireless communication environment comprising an RF fidelity layer of an IoT wireless device and an RF fidelity component of a host system, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional network technologies have had some drawbacks with respect to minimizing an impact of TCP-based retransmissions within a lossy wireless environment. Various embodiments disclosed herein can improve customer experiences within an IoT ecosystem by monitoring wireless conditions of IoT devices, sensors, etc. and controlling data transmissions from/to such devices under lossy wireless conditions.

For example, a method can comprise determining, by a wireless device comprising a processor, e.g., an IoT device, sensor, etc. a characteristic of an RF channel wirelessly coupling the wireless device to an access point (AP) device that has been configured to transfer data, which has been received from the wireless device, to a host device, e.g., a home security system, a home automation system, a building monitor system, a building control system, etc. to facilitate further processing, evaluation, etc. of such data by application(s) executing on the host device.

In embodiment(s), the characteristic can comprise a received signal strength indicator (RSSI), a bit error rate (BER), a reference signal received power (RSRP), a reference signal received quality (RSRQ), a signal-to-interference-plus-noise ratio (SINR), a block error rate (BLER), and/or a bit throughput corresponding to the RF channel. In this regard, in an embodiment, an RF fidelity/functional layer of the wireless device, e.g., which has been communicating with an application executing on the wireless device and portion(s), layer(s), etc. of a protocol stack, network protocol suite etc. of the wireless device, can send control command(s), e.g., Attention (AT) command(s), to a radio module, e.g., a long term evolution (LTE) based radio module, of the wireless device to obtain the characteristic, e.g., via communication(s), register(s), memory location(s), etc. of the radio module.

In other embodiment(s), the RF fidelity/functional layer can obtain the characteristic via AT command(s) and/or probe(s), mechanism(s), etc. not exposed through the AT command(s). For instance, the characteristic, information, etc. associated with the RF channel, radio module, etc. can be collected via other control command(s), method(s), etc., or via direct monitoring of RF and/or data signals. Additionally, other information collected by the RF fidelity/functional layer can comprise information about the wireless device, a corresponding system, e.g., AP device, and/or a corresponding environment, e.g., comprising system antenna capability (e.g., UE antenna capability, AP antenna capability, base station antenna capability, etc.); link loading; reduced power (e.g., reduced system power, reduced UE power, etc.); mobility speed; density of surrounding cell sites; UE battery state, etc.

In other embodiment(s), the RF fidelity/functional layer can probe, determine, monitor, etc. characteristic(s) of the RF channel corresponding to a control channel between the wireless device and the AP device. In this regard, control messages/communications of the control channel utilize wireless resources, device resources (e.g., the protocol stack, network protocol suite, etc. of the wireless device), which are the same and/or similar to resources utilized to communicate data message(s) via a data channel between the wireless device and the AP device. Accordingly, by monitoring characteristic(s) of the RF channel via the control channel, the RF fidelity/functional layer can probe, determine, monitor, etc. such characteristic(s) without artificially sending data packets, e.g., extra test packets, between the wireless device and the AP device using the data channel, e.g., without incurring extra data charges related to sending, via the data channel, the data packets, extra test packets, etc.

In yet other embodiment(s), the RF fidelity/functional layer can probe, determine, monitor, etc. characteristic(s) of the RF channel by obtaining information from the portion(s), layer(s), etc. of the protocol stack, network protocol suite, etc. of the wireless device by obtaining information from devices, sensors, etc. of the wireless device, etc. In this regard, such information can comprise: a determined amount of media access control (MAC) retransmissions that have occurred within a defined period of time; an availability of access points near, in communication with, etc. the wireless device; a link loading corresponding to data packet transfers within the portion(s), layer(s), etc. of the protocol stack, network protocol suite, etc.; a transmission power of the wireless device; a mobility speed (e.g., rate of movement) of the wireless device, e.g., represented by a number of handoffs that have been determined to have occurred within a defined period of time; an antenna capability (e.g., single, multiple-input multiple-output (MIMO), etc.) of the wireless device, an amount of RF interference, e.g., which has been determined to have occurred within a defined period of time, etc.

In turn, in response to a determination that a monitored, probed, etc. characteristic of the RF channel satisfies a defined condition representing a degradation of a fidelity of the RF channel, the RF fidelity/functional layer can "tune", modify, preempt, limit, reduce, withhold, delay, etc. a transmission of outbound data that has been directed to the host device based on a determined classification (e.g., critical/urgent/priority, non-critical/non-urgent/non-priority/normal, control, maintenance, update, standby, etc.) of the outbound data, e.g., to facilitate a reduction in wireless, e.g., TCP-driven, retransmissions of the outbound data due to the poor, lossy, error prone, degraded, etc. fidelity of the RF channel.

In this regard, in response to a determination that the fidelity of the RF channel is poor, lossy, error prone, degraded, etc., the RF fidelity/functional layer can maximize throughput of data/communications that have been classified as critical/urgent/priority, and reduce consumption of network device bandwidth corresponding to retransmission of data/communications that have been classified as non-critical/non-urgent/non-priority/normal, control, etc., e.g., by enabling, allowing, permitting, etc. transmission of the data/communications that have been classified as critical/urgent/priority, while limiting, reducing, withholding, delaying, etc. transmission of the data/communications that have been classified as non-critical/non-urgent/non-priority/normal, control, etc.

In an embodiment, in response to the determination that the fidelity of the RF channel is poor, lossy, error prone, degraded, etc., the RF fidelity/functional layer can limit, reduce, withhold, delay, etc. the transmission of data/communications that have been classified as non-critical/non-urgent/non-priority/normal, control, etc. until characteristic(s) of the RF channel have been determined to improve. In another embodiment, the RF fidelity/functional layer can limit, reduce, withhold, delay, etc. the transmission of the data/communications that have been classified as non-critical/non-urgent/non-priority/normal, control, etc. for a defined period of time, delay period, etc.

In one embodiment, the RF fidelity/functional layer can comprise a memory, buffers, first-in-first-out (FIFO) buffers, etc. to facilitate collection of the data/communications that have been classified as non-critical/non-urgent/non-priority/normal, control, etc., and later facilitate transmission of such stored, buffered, etc. data from the wireless device, e.g., based on a determination that the characteristics of the RF channel have improved after the defined period of time, delay period, etc.

In another embodiment, in response to the determination that the fidelity of the RF channel is poor, lossy, error prone, degraded, etc., the RF fidelity/functional layer can enable, allow, permit, etc. transmission of the data/communications that have been classified as critical/urgent/priority, e.g., without limiting transmission of such data/communications.

In embodiment(s), an RF fidelity component of the host device can probe, determine, monitor, etc. characteristic(s) of the RF channel; and in response to the characteristic(s) of the RF channel being determined to satisfy a defined condition representing a degradation of a fidelity of the RF channel, the RF fidelity component can modify, based on a priority level of outgoing data that has been directed to the wireless device, a transmission of the outgoing data, e.g., to facilitate a reduction of wireless retransmissions of the outgoing data due to the degradation of the fidelity of the RF channel.

In an embodiment, the RF fidelity component can determine, predict, etc. a fidelity of the RF channel based on an analysis, evaluation, etc. of inbound data that has been received from the wireless device. For example, the RF fidelity component can determine whether data, communications, etc. that have been received from the wireless device satisfy a defined condition representing the fidelity of the RF channel is poor, lossy, error prone, degraded, etc.

In this regard, in one embodiment, the RF fidelity component can determine whether a majority of incoming communications that have been received from the wireless device, e.g., over a defined period of time, have been classified as critical/urgent/priority, e.g., instead of comprising a mix of classifications, e.g., critical/urgent/priority, non-critical/non-urgent/non-priority/normal, control, etc.

In turn, in response to determining that a majority of the incoming communications have been classified as critical/urgent/priority, e.g., without comprising the mix of classifications, the RF fidelity component can infer, determine, etc. that the fidelity of the RF channel is poor, lossy, error prone, degraded, etc. Further, based on the determination that the fidelity of the RF channel is poor, lossy, error prone, degraded, etc., the RF fidelity component can filter, limit, etc. a transmission of data from the host device to the wireless device, e.g., enabling transmission of critical/urgent/priority data to the wireless device, while preventing, withholding, etc. transmission of data classified as non-critical/non-urgent/non-priority/normal, control, etc.

For example, in one embodiment, in response to a classification of an incoming communication being determined to satisfy a defined condition with respect to an amount of critical/urgent/priority communications that have been received during a defined period, e.g., representing that a majority of incoming communications that have been received over the defined period have been classified as critical/urgent/priority, the RF fidelity component can withhold, delay, etc. a transmission of a non-critical/non-urgent/non-priority/normal, control, etc. communication from the host device to the wireless device.

In turn, in another embodiment, in response to the characteristic of the RF channel being determined to satisfy a defined condition representing an improvement of the fidelity of the RF channel, e.g., representing that a majority of incoming communications that have been received over the defined period have been classified as non-critical/non-urgent/non-priority/normal, control, etc., the RF fidelity component can send, transmit, etc. (e.g., without limiting, withholding, delaying, etc.) the transmission of the non-critical/non-urgent/non-priority/normal, control, etc. communication from the host device to the wireless device.

In yet another embodiment, in response to the classification of the incoming communication being determined to satisfy the defined condition with respect to the amount of priority communications that have been received during the defined period, e.g., representing that the majority of the incoming communications that have been received over the defined period have been classified as critical/urgent/priority, the RF fidelity component can send, transmit, etc. (e.g., without limiting, withholding, delaying, etc.) a critical/urgent/priority communication directed to wireless device.

In an embodiment, the RF fidelity component of the host device can determine the fidelity of the RF channel based on information that has been appended to data/communications that have been received, via the data channel, from the wireless device. In this regard, in response to determining that characteristic(s) of the RF channel satisfy a defined condition representing that the fidelity of the RF channel is poor, lossy, error prone, degraded, etc., the RF fidelity layer of the wireless device can append information representing that the fidelity of the RF channel has been determined to be poor, error prone, degraded, etc. to existing data/communications readied to be sent to the host device. In embodiment(s), the appended information can represent an RSSI, BER, RSRP, RSRQ, SINR, BLER, bit throughput, etc. corresponding to the RF channel.

In turn, upon receipt of the data/communications comprising the appended information, the RF fidelity component of the host device can remove, strip, etc. the appended information from the data/communications to obtain application data, and forward the application data to a host application that is executing on the host device to facilitate further processing of the application data.

Further, in response to a determination, based on the appended information, that the fidelity of the RF channel is poor, lossy, error prone, degraded, etc., the RF fidelity component can filter, limit, etc. transmission(s) of communication(s)/data from the host device to the wireless device based on a determined classification of such communications(s)/data, e.g., enabling transmissions of critical/urgent/priority data to the wireless device, while preventing, withholding, etc. transmissions of data classified as non-critical/non-urgent/non-priority/normal, control, etc.

In another embodiment, in response to a determination, based on the appended information, that the fidelity of the RF channel is poor, lossy, error prone, degraded, etc., the RF fidelity component can send, transmit, etc. (e.g., without limiting, withholding, delaying, etc.) communication(s)/data that have been classified as critical/urgent/priority directed to the wireless device.

In one embodiment, a machine-readable storage medium can comprise executable instructions that, when executed by a processor of a wireless device, e.g., an IoT wireless device, facilitate performance of operations, comprising: creating an RF fidelity layer within an upper portion of a protocol stack of the IoT wireless device; monitoring, via the RF fidelity layer, a characteristic of an RF link between the IoT wireless device and an AP device; and in response to the characteristic of the RF link being determined to satisfy a defined condition representing that a fidelity of the RF link is lossy, preempting, via the RF fidelity layer, a transmission of data from the IoT wireless device to a host device to facilitate a reduction in TCP-based retransmissions of the data occurring under a lossy condition of the RF link.

In an embodiment, the monitoring can comprise monitoring the characteristic of the RF link corresponding to a control channel between the IoT wireless device and the access point device. In another embodiment, the preempting can comprise delaying a transmission of a non-urgent communication that has been directed to the host device.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As mentioned above, conventional network technologies have had some drawbacks with respect to minimizing an impact of TCP-based retransmissions within lossy wireless environments. In this regard, TCP can "mask" a lossy link layer via repeated retransmissions to correct for lost/erred information packets, e.g., application developers program functions of a TCP device, e.g., a network edge device, assuming that end-to-end connectivity may incur data flow backups/bottlenecks, while remaining error free, e.g., utilizing wired connections. In turn, higher-level applications interfacing with lower TCP software/device layers, e.g., a TCP stack, "fire and forget" information to be transmitted, while the TCP stack is tasked with successfully delivering the information to its destination. In this regard, a network edge device in a lossy radio link can incur significant data overage charges to transmit a given amount of information due to the increased billable retransmissions required to correct for link errors.

Further, while the TCP standard has limited semaphore/flag functionality within the TCP stack, such functionality does not address the lossyness of a radio link. Further, although conventional network technologies may try to address the lossyness of a radio link by creating application specific codes, and sending such codes, via a network/radio edge device, to an application of a destination device to facilitate adjustment of traffic flow, such use of application specific codes is fundamentally flawed for at least the following reasons: 1) the application specific codes must be sent over a radio link using a billable data channel on a frequent basis—as radio link fidelity may change over time—which can result in even more billable data use over the radio link; and 2) the application specific codes are passed through the same lossy radio link and are subject to the same failures/retries as the data payload that is subject to such failures/retries.

To address these and other concerns of conventional network technologies, various embodiments disclosed herein can improve customer experiences within an IoT ecosystem by monitoring wireless conditions of IoT devices, sensors, etc., and controlling data transmissions between such devices and host system(s) based on determined classification(s) of data that have been transmitted between the devices and respective host system(s)—without incurring additional data transfer charges, without incurring additional loading of an already tasked, error prone, etc. radio/RF link, etc.

Figure 2:
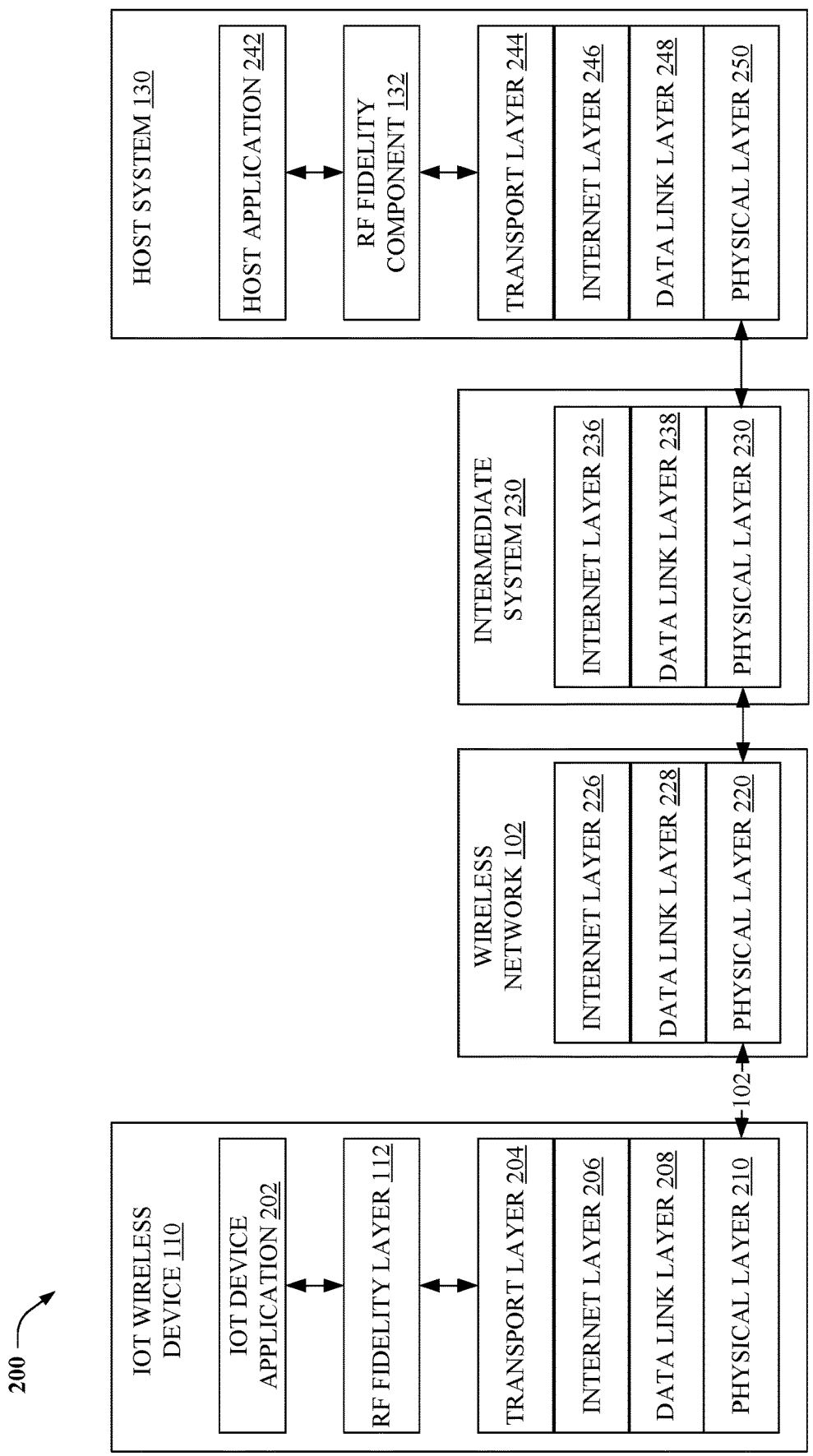
FIG. 2 illustrates a block diagram of an end-to-end TCP stack of an IoT wireless communication environment, in accordance with various example embodiments.

In this regard, and now referring to FIGS. 1 and 2, block diagrams of an IoT wireless communication environment (100) comprising an RF fidelity layer of an IoT wireless device and an RF fidelity component of a host system; and an end-to-end TCP stack (200) within the IoT wireless communication environment are illustrated, respectively, in accordance with various example embodiments.

In embodiment(s), IoT wireless device 110 can comprise, e.g., a sensor, a meter, a utility (e.g., water, gas, electricity, etc.) meter, a radio frequency identification (RFID) device, a machine-to-machine (M2M) based device, a wireless and/or wired device, an appliance sensor, a security sensor, a motion sensor, a camera, a health monitor device, a fitness tracking device, a smartwatch, a home security system device, a thermostat, a smartphone, a laptop device, a tablet device, a television device, a vehicle device, a gaming console device, a user equipment (UE), a power and/or energy control device, an industrial control and/or monitoring device, etc.

In one embodiment, IoT wireless device 110 can be a uniquely identifiable embedded computing device, e.g., assigned a unique IP address, and IoT device application 202 can exchange information and/or perform actions (e.g., remote monitoring, remote control, etc.) using information, network communications, data, etc. transferred, via wireless network 120, between the IoT wireless device 110 and application(s), e.g., host application 242, of host system 130.

In this regard, IoT wireless device 110 can be communicatively coupled to host system 130, via wireless interface 102, utilizing access point (AP) 122, e.g., a macro AP, a Femto AP, a pico AP, a base station, etc. Wireless interface 102 can comprise an over-the-air wireless link comprising a downlink (DL) and an uplink (UL) (both not shown) that can utilize a predetermined band of radio frequency (RF) spectrum associated with, e.g., cellular, LTE, LTE advanced (LTE-A), GSM, 3GPP universal mobile telecommunication system (UMTS), Institute of Electrical and Electronics Engineers (IEEE) 802.XX technology (WiFi, Bluetooth, etc.), worldwide interoperability for microwave access (WiMax), a wireless local area network (WLAN), Femto, near field communication (NFC), Wibree, Zigbee, satellite, WiFi Direct, etc. Accordingly, wireless network 120 can be associated with RF spectrums corresponding to respective types of wireless technologies including, but not limited to, cellular, WiFi, WiMax, WLAN, Femto, NFC, Wibree, Zigbee, satellite, WiFi Direct, etc.

Referring now to FIG. 2, in an embodiment, component(s), logic, etc. of RF fidelity layer 112 can be implemented within respective portion(s), layer(s), etc. of a protocol stack, network protocol suite, etc. of IoT wireless device 110, e.g., between IoT device application 202 and transport layer 204 (e.g., comprising TCP functionality), which is between RF fidelity layer 112 and internet layer 206, data link layer 208, and physical layer 210. Accordingly, IoT device application 202 can "send and fire" data, data packets, communications, etc. (i.e., for transmission to host system 130) to transport layer 204—without having knowledge, awareness, etc. of function(s), operation(s), etc. being performed by RF fidelity layer 112.

In this regard, such function(s), operation(s), etc. being performed by RF fidelity layer 112 can comprise determining a characteristic, e.g., RSSI, BER, RSRP, RSRQ, SINR, BLER, bit throughput, etc. of an RF channel that couples, via wireless interface 102, IoT wireless device 110 to AP 122—AP 122 being configured to transfer, e.g., via intermediate system 230, data between IoT wireless device 110 and host system 130, e.g., a home security system, a home automation system, a building monitor system, a building control system, etc. to facilitate further processing, evaluation, etc. of such data by host application 242.

In an embodiment, RF fidelity layer 112 can determine the characteristic of the RF channel by sending control command(s), e.g., AT command(s), to a radio module, e.g., LTE radio module 730 (see below) of IoT wireless device 110 to obtain the characteristic, e.g., via communication(s), register(s), memory location(s), etc. of the radio module.

In other embodiment(s), RF fidelity layer 112 can obtain the characteristic of the RF channel via probe(s), mechanism(s), etc. not exposed through the AT command(s). For instance, the characteristic, information, etc. associated with the RF channel, radio module, etc. can be collected via other control command(s), method(s), etc., or via direct monitoring of RF and/or data signals. Additionally, other information collected by RF fidelity layer 112 can comprise information about: IoT wireless device 110, a corresponding system, e.g., AP 122, and/or a corresponding environment, e.g., information comprising system antenna capability (e.g., IoT wireless device 110 antenna capability, AP 122 antenna capability, etc.); link loading; reduced power (e.g., reduced system power, reduced IoT wireless device 110 power, etc.); a mobility speed; a density of surrounding cell sites; an IoT wireless device 110 battery state, etc.

In another embodiment, the RF channel can comprise a data channel and a control channel; and RF fidelity layer 112 can monitor, determine, etc. the characteristic of the control channel based on control messages/communications that have been communicated between IoT wireless device 110 and AP 122. In this regard, since the control messages/communications utilize wireless resources, device resources, etc. of IoT wireless device 110 that are the same and/or similar to resources utilized to send, communicate, etc., via the data channel, data messages/communications to host system 130, RF fidelity layer 112 can probe, determine, monitor, etc. characteristic(s) of the RF channel via the control channel, without artificially sending data packets, extra data packets, test packets, etc. from IoT wireless device 110 to AP 122 using the data channel, e.g., without incurring extra data charges related to sending, communicating, etc. data messages/communications to host system 130 via AP 122.

In yet another embodiment(s), RF fidelity layer 112 can probe, determine, monitor, etc. characteristic(s) of the RF channel by obtaining information from portion(s), layer(s), etc. of a protocol stack, network protocol suite, etc. of IoT wireless device 110; and/or by obtaining information from devices, sensors, etc. of wireless device, etc. In this regard, such information can comprise: a determined amount of MAC retransmissions that have occurred within a defined period of time; an availability of access points near, in communication with, etc. wireless IoT device 110; a link loading corresponding to data packet transfers within the portion(s), layer(s), etc. of the protocol stack, network protocol suite, etc.; a transmission power of IoT wireless device 110; a mobility speed (e.g., rate of movement) of IoT wireless device, e.g., represented by a number of handoffs that have been determined to have occurred within a defined period of time; an antenna capability (e.g., single, multiple-input multiple-output (MIMO), etc.) of IoT wireless device 110, an amount of RF interference, e.g., which has been determined to have occurred within a defined period of time, etc.

In turn, in response to a determination that the monitored, probed, etc. characteristic of the RF channel satisfies a defined condition representing a degradation of a fidelity of the RF channel, RF fidelity layer 112 can tune, modify, preempt, limit, reduce, withhold, delay, etc.—based on a determined classification (e.g., critical/urgent/priority, non-critical/non-urgent/non-priority/normal, control, maintenance, update, standby, etc.) of outbound data that has been received from IoT device application 202 to be transmitted to host system 130—a transmission of the outbound data to host system 130.

In this regard, in response to a determination that the fidelity of the RF channel is poor, lossy, error prone, degraded, etc., RF fidelity layer 112 can maximize throughput of data, communications, etc. that have been classified as critical/urgent/priority, and reduce consumption of network device bandwidth corresponding to retransmission of data that has been classified as non-critical/non-urgent/non-priority/normal, control, etc. by enabling, allowing, permitting, etc. transmission of the data that has been classified as critical/urgent/priority, while limiting, reducing, withholding, delaying, etc. transmission of the data that has been classified as non-critical/non-urgent/non-priority/normal, control, etc.

In an embodiment, RF fidelity layer 112 can limit, reduce, withhold, delay, etc. the transmission of the outbound data that has been classified as non-critical/non-urgent/non-priority/normal, control, etc. until characteristic(s) of the RF channel have been determined to improve. In another embodiment, RF fidelity layer 112 can limit, reduce, withhold, delay, etc. the transmission of outbound data that has been classified as non-critical/non-urgent/non-priority/normal, control, etc. for a defined period of time, defined delay period, etc.

In one embodiment, RF fidelity layer 112 can comprise a memory, buffers, FIFO buffers, etc. (not shown) to facilitate collection of the outbound data that has been classified as non-critical/non-urgent/non-priority/normal, control, etc., and facilitate a later transmission of such stored, buffered, etc. data from wireless device 110, e.g., based on a determination that the characteristics of the RF channel have improved after a defined period of time, delay period, etc.

Figure 3:
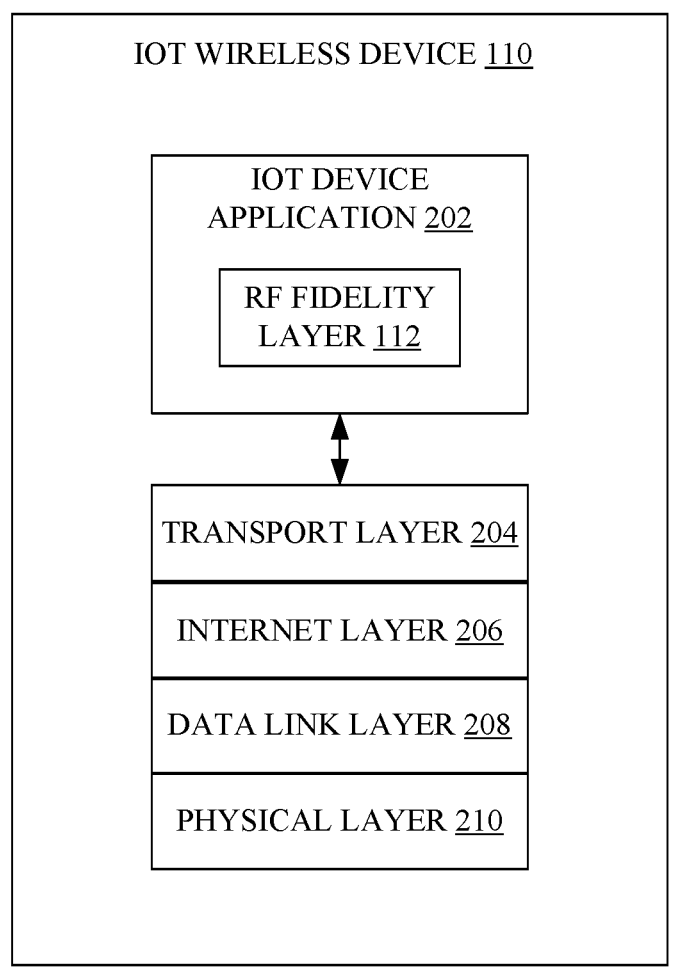
FIG. 3 illustrates a block diagram of an IoT wireless device comprising an RF fidelity layer, in accordance with various embodiments.

In another embodiment illustrated by FIG. 3, component(s), logic, etc. of RF fidelity layer 112 can be implemented, integrated, etc. within IoT device application 202. In this regard, IoT device application 202 can perform functions, operations, etc. described herein with respect to, e.g., limiting, reducing, withholding, delaying, etc. the transmission of outbound data to host system 130 that has been classified as non-critical/non-urgent/non-priority/normal, control, etc.

Figure 4:
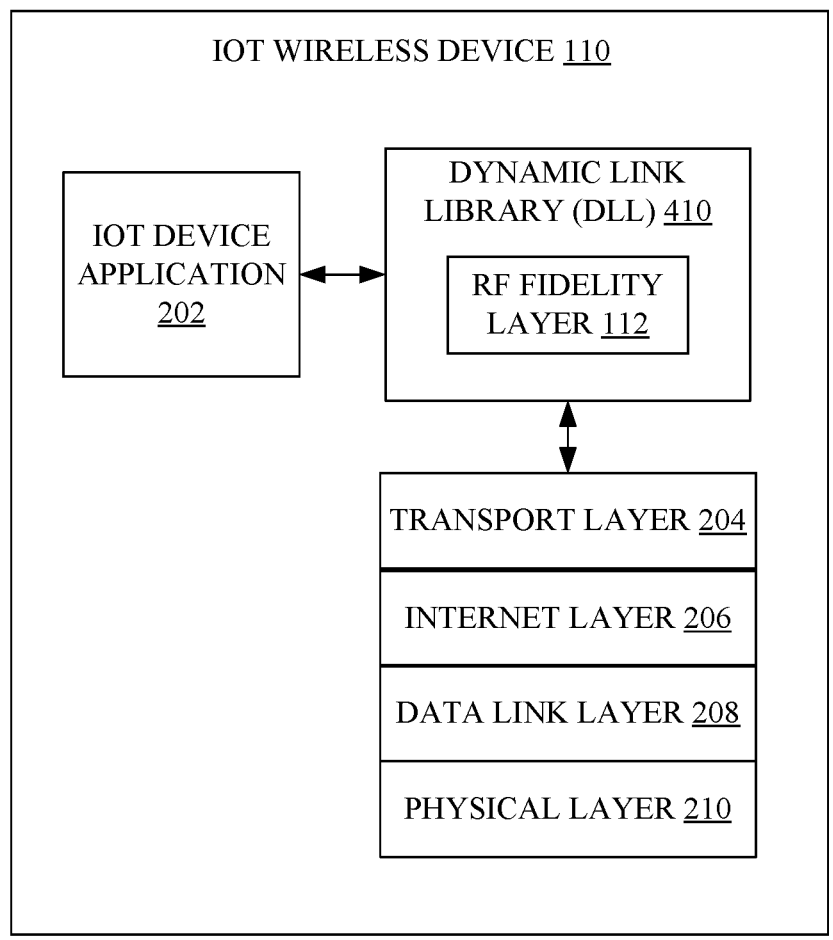
FIG. 4 illustrates a block diagram of another IoT wireless comprising an RF fidelity layer, in accordance with various embodiments.

In yet another embodiment illustrated by FIG. 4, component(s), logic, etc. of RF fidelity 112 can be implemented as a device library, e.g., a dynamic linked library (DLL), which can be accessed from IoT device application 202. In this regard, IoT device application 202 can perform, via the DLL, functions, operations, etc. described herein with respect to, e.g., limiting, reducing, withholding, delaying, etc. the transmission of outbound data to host system 130 that has been classified as non-critical/non-urgent/non-priority/normal, control, etc. by executing/calling functions of the DLL.

Now referring to FIG. 2, RF fidelity component 132 of host system 130 can probe, determine, monitor, etc. characteristic(s) of the RF channel; and in response to the characteristic(s) of the RF channel being determined to satisfy a defined condition representing a degradation of a fidelity of the RF channel, RF fidelity component 132 can modify, based on a priority level of outgoing data that has been directed from host application 242 to IoT wireless device 110, a transmission of the outgoing data, e.g., to facilitate a reduction of wireless retransmissions of the outgoing data due to the degradation of the fidelity of the RF channel.

In embodiment(s), host system 130 can comprise a home security system, a home automation system, a building monitor system, a building control system, etc. In turn, host application 242 can send/receive data, via intermediate system 230 and wireless network 102, to/from IoT wireless device 110 to facilitate processing, by host application 242 based on the data, information corresponding to home security, automation, control, etc. In embodiment(s), host system 130 can be communicatively coupled to intermediate system 230 utilizing one or more of the Internet (or another communication network (e.g., an Internet protocol (IP) based network)), a digital subscriber line (DSL)-type or broadband network facilitated by Ethernet or other technology, and/or wireless interface(s), e.g., cellular, WiFi, WiMax, WLAN, Femto, NFC, Wibree, Zigbee, satellite, WiFi Direct, etc. In this regard, components, portions (s, etc. of IoT communication environment 100 can comprise a cloud-based, centralized, communication platform, Internet platform, WAN, etc. (see, e.g., 1590 below), and component(s), portion(s), etc. of host system 130 can be implemented within the cloud-based, centralized, communication platform.

In an embodiment, component(s), logic, etc. of RF fidelity component 132 can be implemented within respective portion(s), layer(s), etc. of a protocol stack, network protocol suite, etc. of host system 130, e.g., between host application 242 and transport layer 244 (e.g., comprising TCP functionality), which is between RF fidelity component 132 and internet layer 246, data link layer 248, and physical layer 250. Accordingly, host application 242 can "send and fire" data, data packets, communications, etc. (i.e., for transmission to IoT wireless device 110) to transport layer 244—without having knowledge, awareness, etc. of function(s), operation(s), etc. being performed by RF fidelity component 132.

In this regard, such function(s), operations(s), etc. being performed by RF fidelity component 132 can comprise determining, predicting, etc. a fidelity of the RF channel based on an analysis, evaluation, etc. of inbound data that has been received from IoT wireless device 110. For example, RF fidelity component 132 can determine whether data, communications, etc. that have been received from IoT wireless device 110 satisfy a defined condition representing the fidelity of the RF channel is poor, lossy, error prone, degraded, etc.

In one embodiment, RF fidelity component 132 can determine whether a majority of incoming communications that have been received from IoT wireless device 110, e.g., over a defined period, have been classified as critical/urgent/priority, e.g., instead of comprising a mix of classifications, e.g., critical/urgent/priority, non-critical/non-urgent/non-priority/normal, control, etc.

In turn, in response to determining that a majority of the incoming communications that have been received from IoT wireless device 110 have been classified as critical/urgent/priority, e.g., without comprising the mix of classifications, RF fidelity component 132 can infer, determine, etc. that the fidelity of the RF channel is poor, lossy, error prone, degraded, etc. Further, based on the determination that the fidelity of the RF channel is poor, lossy, error prone, degraded, etc., RF fidelity component 132 can withhold, delay, filter, limit, etc. a transmission of data, which has been received from host application 242, to IoT wireless device 110. In this regard, in embodiment(s), RF fidelity component 132 can enable transmission of critical/urgent/priority data to IoT wireless device 110 during poor, lossy, error prone, degraded, etc. wireless conditions, while withholding, delaying, etc. transmission of data classified as non-critical/non-urgent/non-priority/normal, control, etc. under such conditions.

For example, in one embodiment, in response to a classification of an incoming communication from IoT wireless device 110 being determined to satisfy a defined condition with respect to an amount of critical/urgent/priority communications that have been received from IoT wireless device 110 during a defined period, e.g., representing that a majority of incoming communications that have been received over the defined period have been classified as critical/urgent/priority, RF fidelity component 132 can withhold, delay, etc. a transmission of a non-critical/non-urgent/non-priority/normal, control, etc. data/communication that has been directed to IoT wireless device 110.

In another embodiment, in response to the characteristic of the RF channel being determined to satisfy a defined condition representing an improvement of the fidelity of the RF channel, e.g., representing that a majority of incoming communications that have been received from IoT wireless device 110 over the defined period have been classified as non-critical/non-urgent/non-priority/normal, control, etc., RF fidelity component 132 can transmit, send, etc. (e.g., without limiting, withholding, delaying, etc.) the non-critical/non-urgent/non-priority/normal, control, etc. communication directed to IoT wireless device 110.

In yet another embodiment, in response to the classification of the incoming communication being determined to satisfy the defined condition with respect to the amount of priority communications that have been received during the defined period, e.g., representing that the majority of the incoming communications that have been received over the defined period have been classified as critical/urgent/priority, RF fidelity component 132 can transmit, send, etc. (e.g., without limiting, withholding, delaying etc.) critical/urgent/priority data/communication(s) directed to IoT wireless device 110.

In an embodiment, RF fidelity component 132 can determine the fidelity of the RF channel based on information that has been appended to data/communications that have been received from IoT wireless device 110. In this regard, in response to a determination, by RF fidelity layer 112 of IoT wireless device 110, that a characteristic of the RF channel satisfies a defined condition representing that the fidelity of the RF channel is poor, lossy, error prone, degraded, etc., RF fidelity layer 112 can append information representing that the fidelity of the RF channel has been determined to be poor, error prone, degraded, etc. to existing data/communications readied to be sent to the host system 130. In embodiment(s), the appended information can represent an RSSI, BER, RSRP, RSRQ, SINR, BLER, bit throughput, etc. corresponding to the RF channel.

In turn, upon receipt of the data/communications comprising the appended information, RF fidelity component 132 can remove, strip, etc. the appended information from the data/communications to obtain application data, and forward the application data to host application 242 to facilitate further processing of the application data by host application 242.

Further, in response to a determination, based on the appended information, that the fidelity of the RF channel is poor, lossy, error prone, degraded, etc., RF fidelity component 132 can filter, limit, etc. transmission(s) of communications/data that have been received from host application 242 and directed to IoT wireless device 110, e.g., enabling transmissions of critical/urgent/priority data to IoT wireless device 110, while preventing, withholding, etc. transmissions of non-critical/non-urgent/non-priority/normal, control, etc. data to IoT wireless device 110.

In this regard, in another embodiment, in response to a determination, based on the appended information, that the fidelity of the RF channel is poor, lossy, error prone, degraded, etc., RF fidelity component 132 can send, transmit, etc. (e.g., without withholding, delaying, etc.) communications/data that have been classified as critical/urgent/priority directed to IoT wireless device 110.

In one embodiment, RF fidelity component 132 can comprise a memory, buffers, FIFO buffers, etc. (not shown) to facilitate collection of the data that has been received from host application 242 for transmission to IoT wireless device 110, and that has been determined to be classified as non-critical/non-urgent/non-priority/normal, control, etc.—such stored, buffered, etc. data being transmitted to wireless device 110 upon a determination, e.g., after a defined period of time, delay period, etc. that the characteristics of the RF channel have improved.

Figure 5:
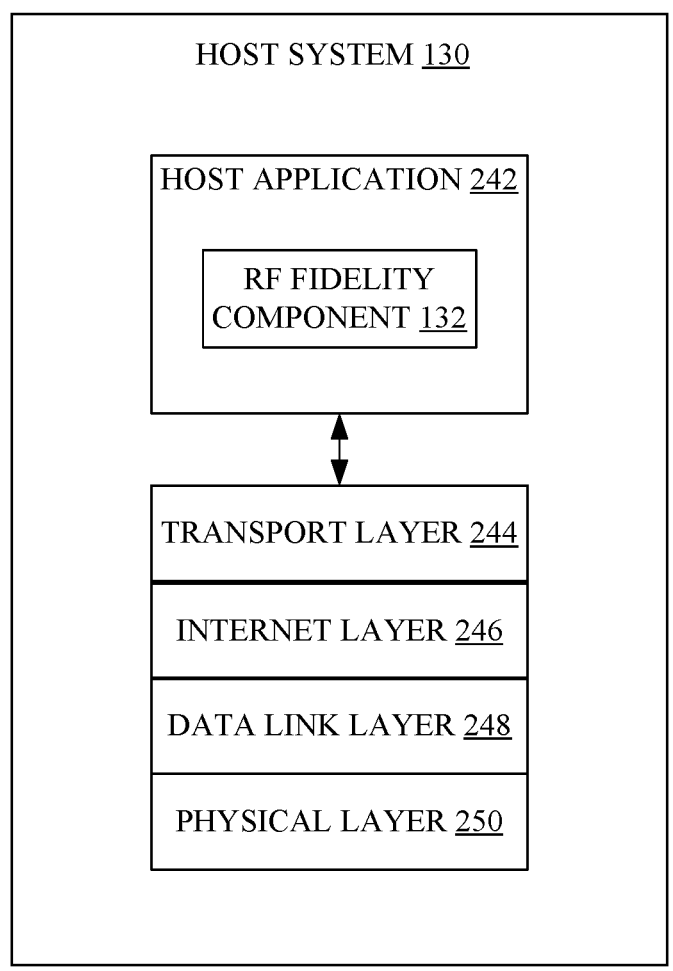
FIG. 5 illustrates a block diagram of a host system comprising an RF fidelity component, in accordance with various embodiments.

In another embodiment illustrated by FIG. 5, component(s), logic, etc. of RF fidelity component 132 can be implemented, integrated, etc. within host application 242. In this regard, host application 242 can perform functions, operations, etc. described herein with respect to, e.g., limiting, reducing, withholding, delaying, etc. the transmission of data that has been directed to IoT wireless device 110 and classified as non-critical/non-urgent/non-priority/normal, control, etc.

Figure 6:
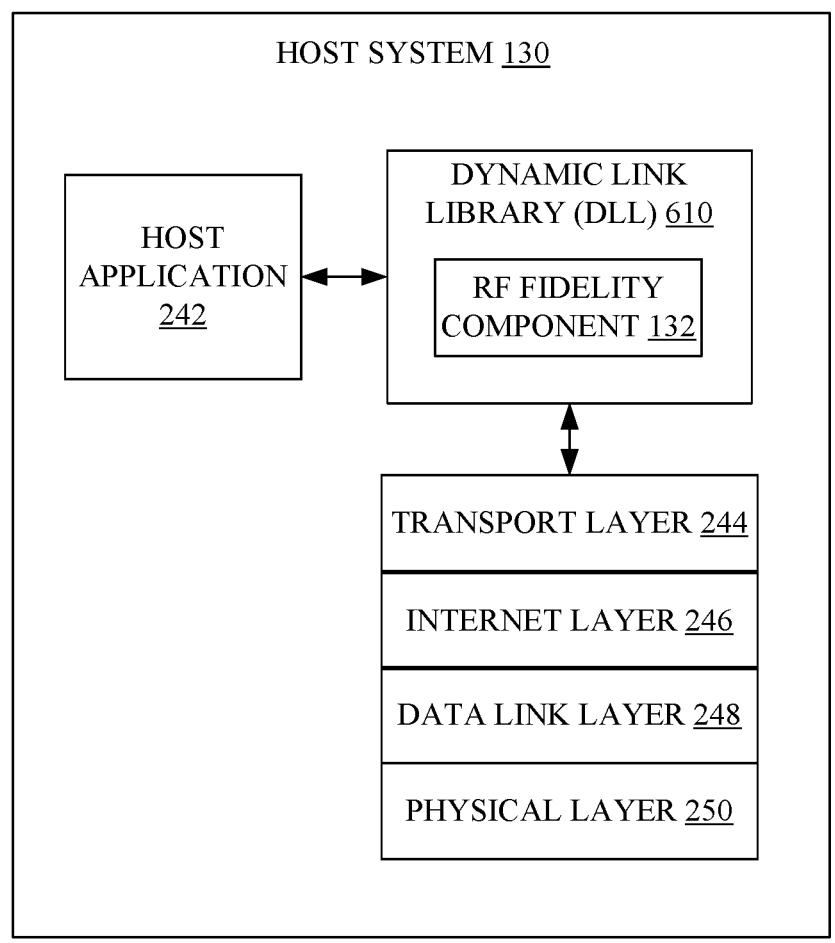
FIG. 6 illustrates a block diagram of another host system comprising an RF fidelity component, in accordance with various embodiments.

In yet another embodiment illustrated by FIG. 6, component(s), logic, etc. of RF fidelity component 132 can be implemented as a device library, e.g., a DLL, which can be accessed from host application 242. In this regard, host application 242 can perform, e.g., by executing/calling functions of the DLL, operations described herein with respect to, e.g., limiting, reducing, withholding, delaying, etc. the transmission of data that has been directed to IoT wireless device 110 and that has been classified as non-critical/non-urgent/non-priority/normal, control, etc.

Figure 7:
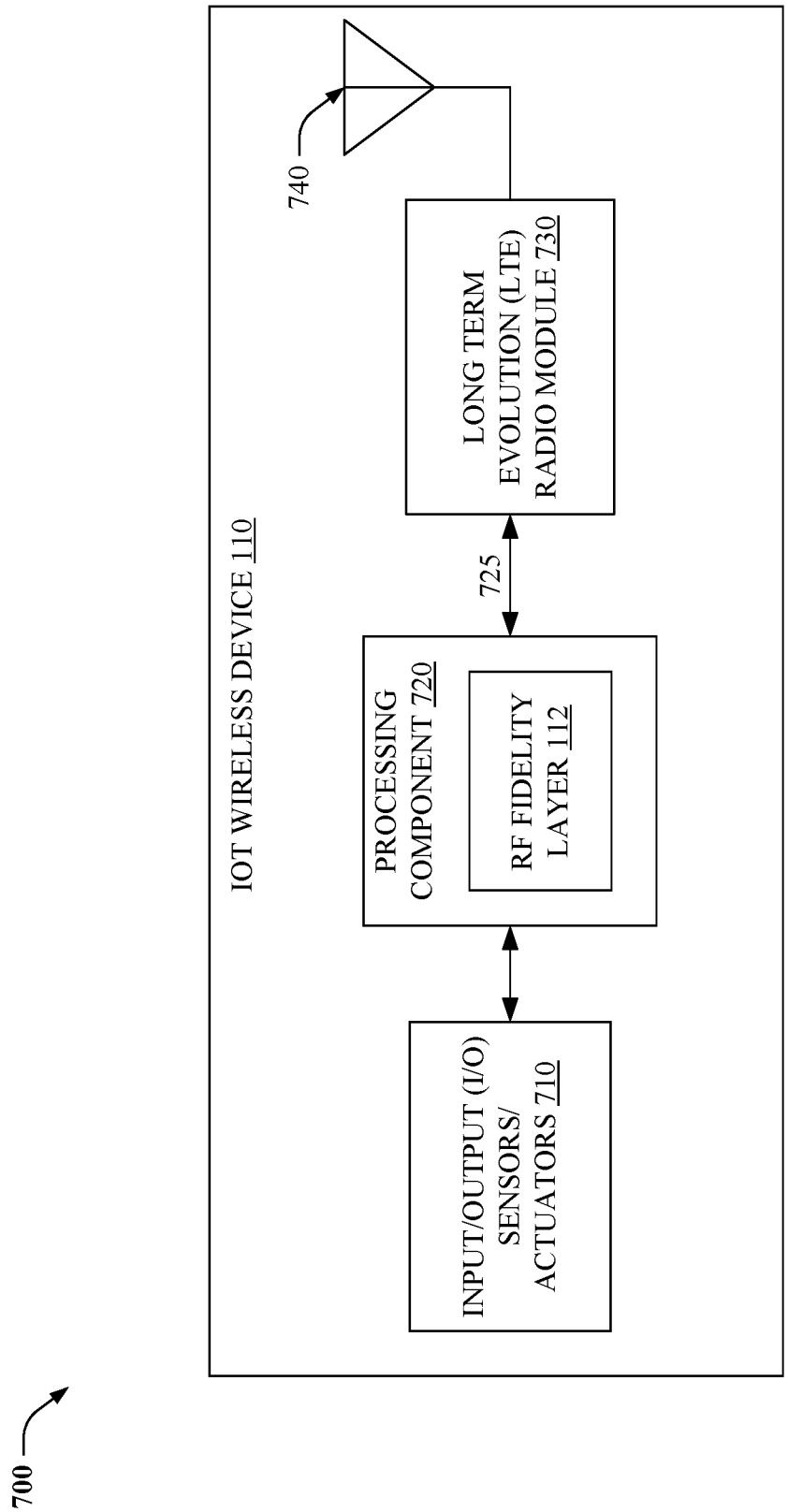
FIG. 7 illustrates a block diagram of an IoT wireless device, in accordance with various embodiments.

Now referring to FIG. 7, a block diagram (700) of an IoT wireless device comprising RF fidelity layer 112 is illustrated, in accordance with various embodiments. Processing component 710 can send/receive information to/from input/output (I/O) sensors/actuators 710. In embodiment(s), I/O sensors/actuators 710 can comprise a sensor, a meter, a utility (e.g., water, gas, electricity, etc.) meter, an RFID device, an M2M based device, a wireless and/or wired device, an appliance sensor, a security sensor, a motion sensor, a camera, a health monitor device, a fitness tracking device, a smartwatch, a home security system device, a thermostat, a smartphone, a laptop device, a tablet device, a television device, a vehicle device, a gaming console device, a UE, a power and/or energy control device, an industrial control and/or monitoring device, etc. In this regard, processing component 710 can send, via a radio/RF link (e.g., 102) coupled to LTE radio module 730 using antenna(s) 740, information obtained from I/O sensors/actuators 710 directed to host device 130, e.g., to facilitate further processing of the information by host application 242.

Further, processing component 720 can comprise RF fidelity layer 112, which can probe, determine, monitor, etc. characteristic(s) of a radio/RF link (e.g., 102), e.g., corresponding to a control channel, between IoT wireless device 110 and AP 122. In this regard, RF fidelity layer 112 can probe, determine, monitor, etc. the characteristic(s) of the radio/RF link by sending, via interface 725, AT command(s) to LTE radio module 730.

In turn, based on the AT command(s), LTE radio module 730 can provide, e.g., via interface 725 and/or registers, memory locations, etc. (not shown), the characteristics(s) (e.g., RSSI, BER, RSRP, RSRQ, SINR, BLER, a bit throughput, etc. of the radio/RF link) to processing component 720 and/or RF fidelity layer 112.

In other embodiment(s), RF fidelity layer 112 can obtain the characteristic(s) via probe(s), mechanism(s), etc. not exposed through the AT command(s). For instance, the characteristic(s) can be collected via other control command(s), method(s), etc., or via direct monitoring of RF and/or data signals. Additionally, other information collected by RF fidelity layer 112 can comprise information about IoT wireless device 110 and/or AP 122, e.g., IoT wireless device antenna capability, AP 122 antenna capability, etc.; link loading; reduced power (e.g., reduced AP 122 power, reduced IoT wireless device 110 power, etc.); mobility speed, e.g., of IoT wireless device 110; a density of surrounding cell sites, e.g., a density of cell sites surrounding, within a predetermined distance, etc. of IoT wireless device 110; a battery state of IoT wireless device 110, etc.

FIGS. 8-14 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
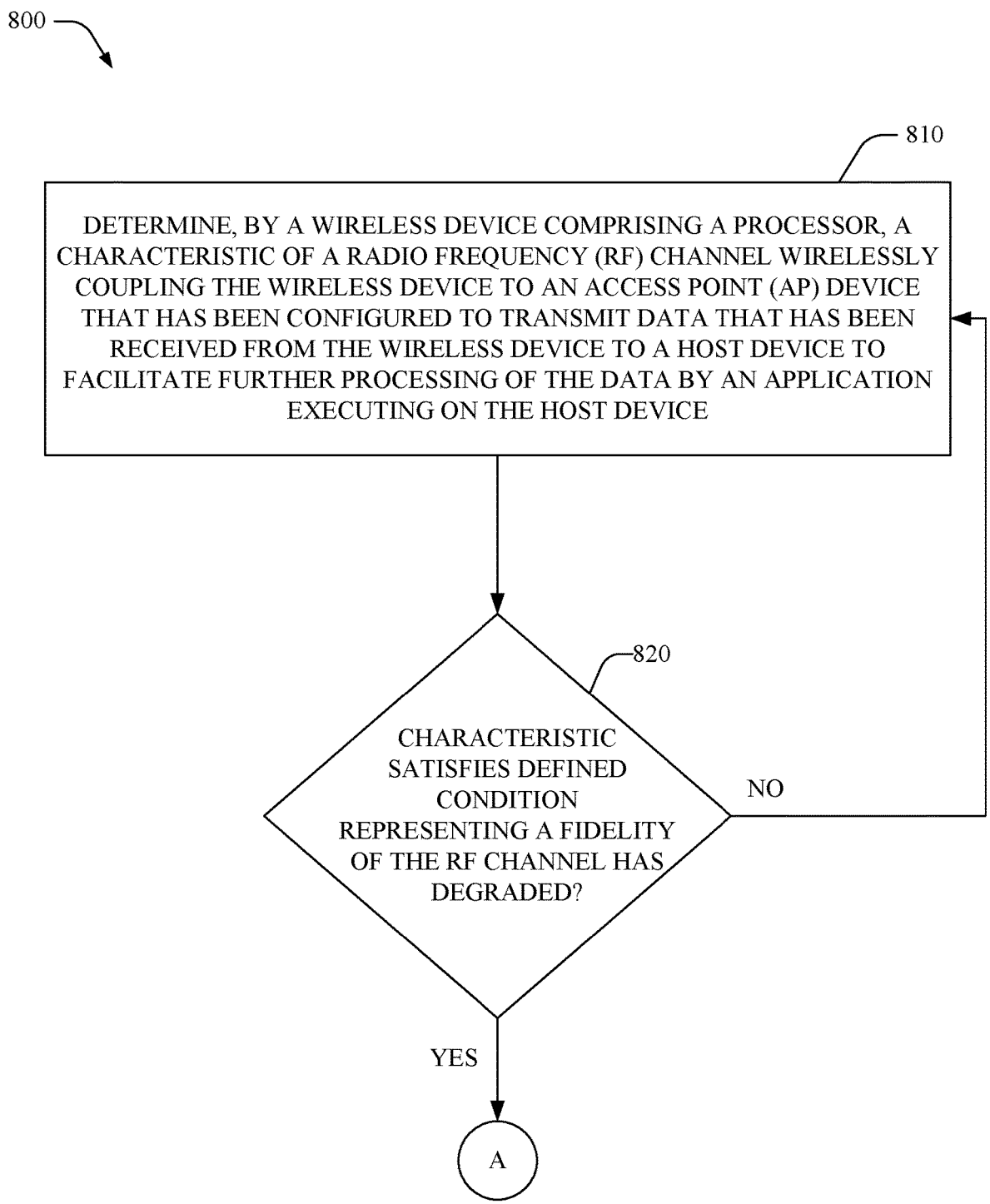
FIGS. 8-10 illustrate flowcharts of methods associated with an IoT wireless device comprising an RF fidelity layer, in accordance with various example embodiments.
Figure 9:
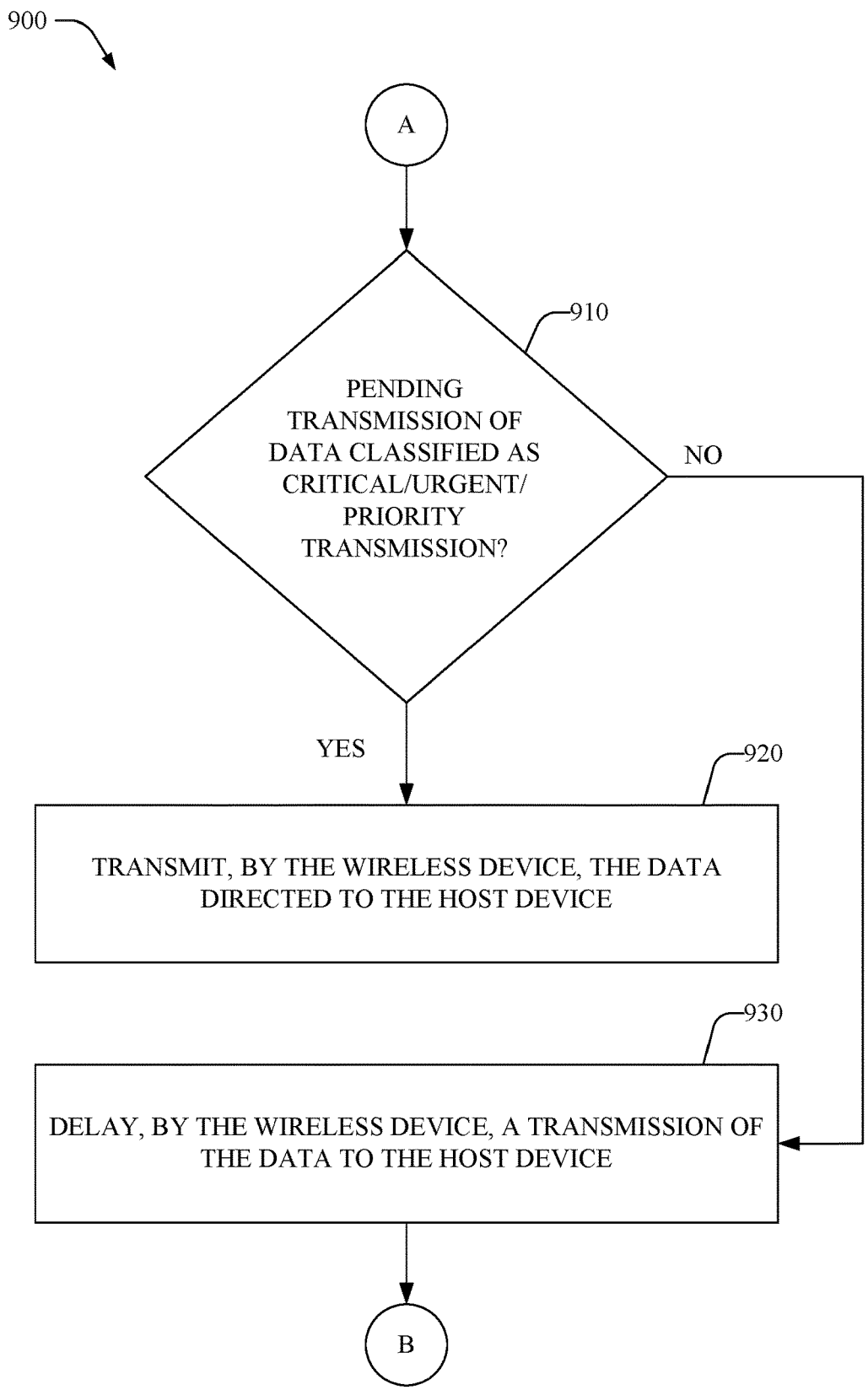
Figure 10:
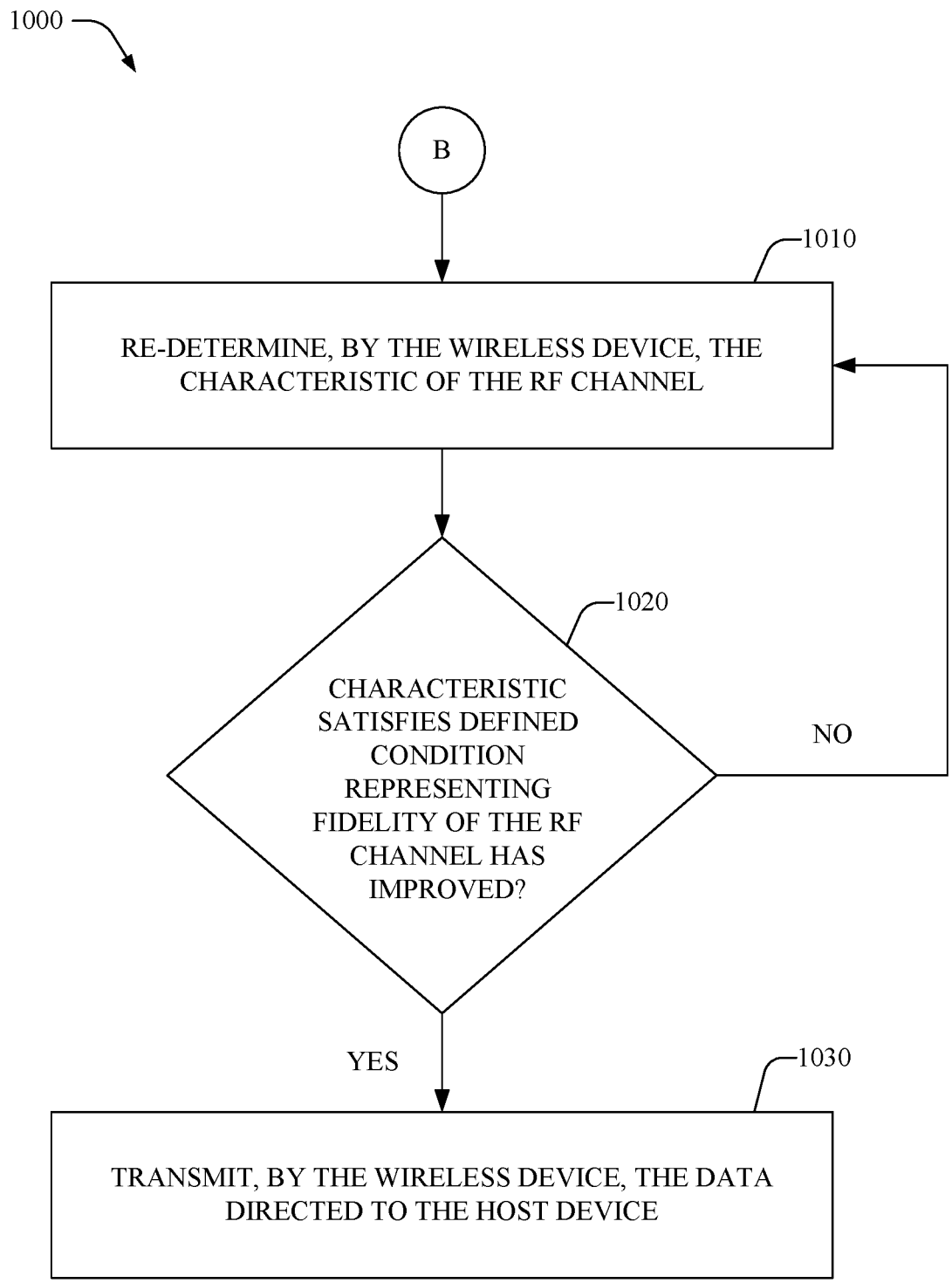
Figure 11:
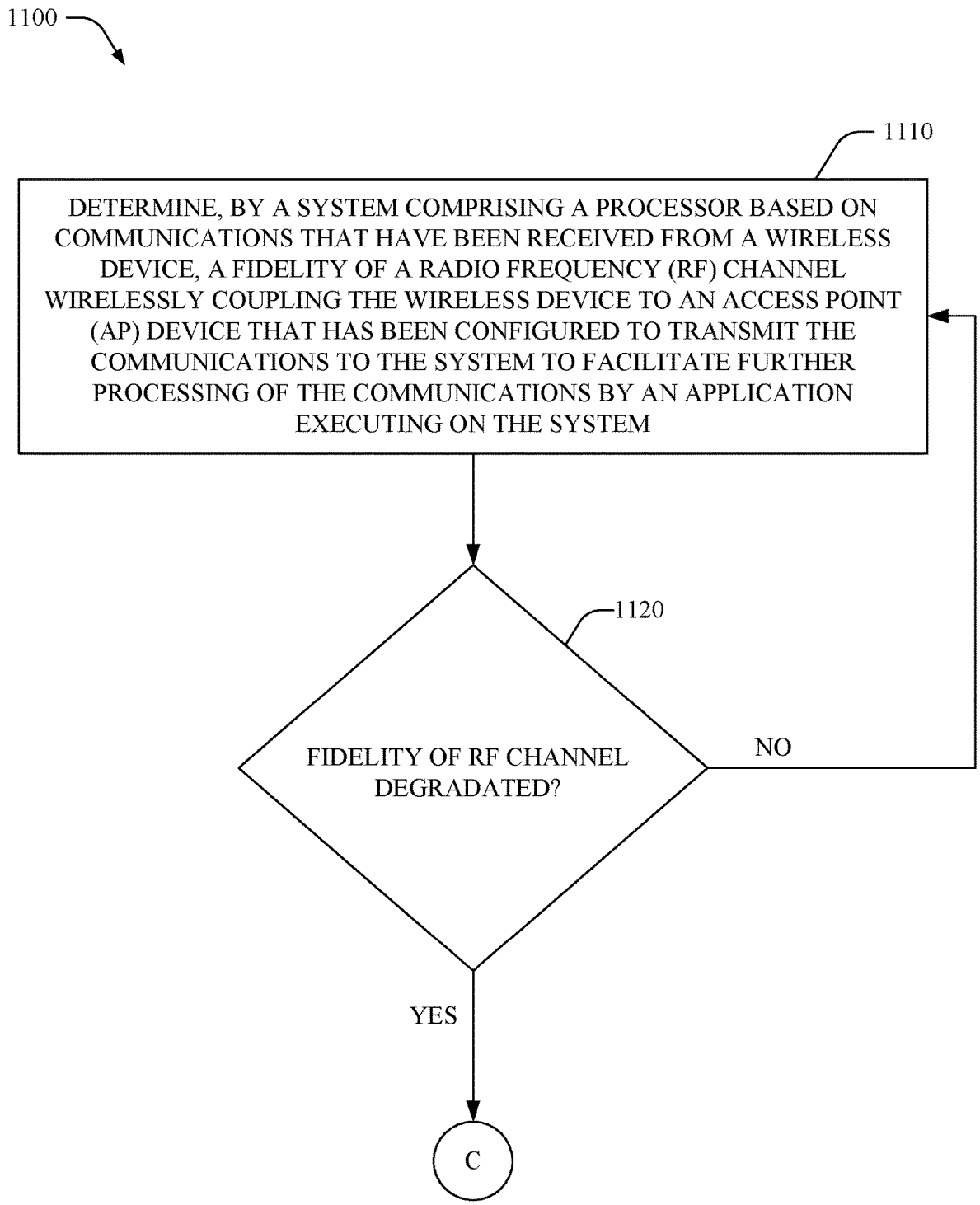
FIGS. 11-14 illustrate flowcharts of methods associated with a host system comprising an RF fidelity component, in accordance with various embodiments.
Figure 12:
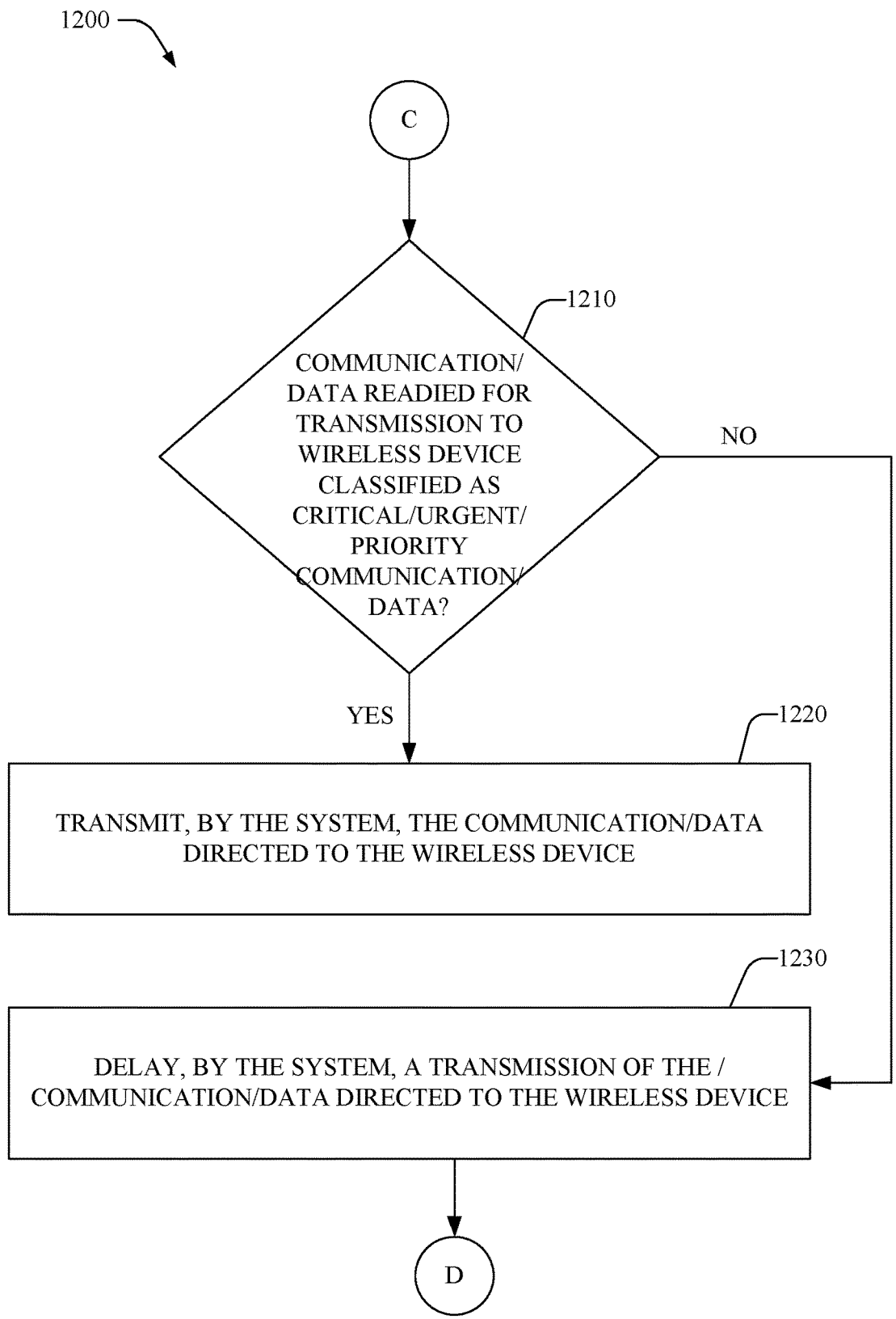
Figure 13:
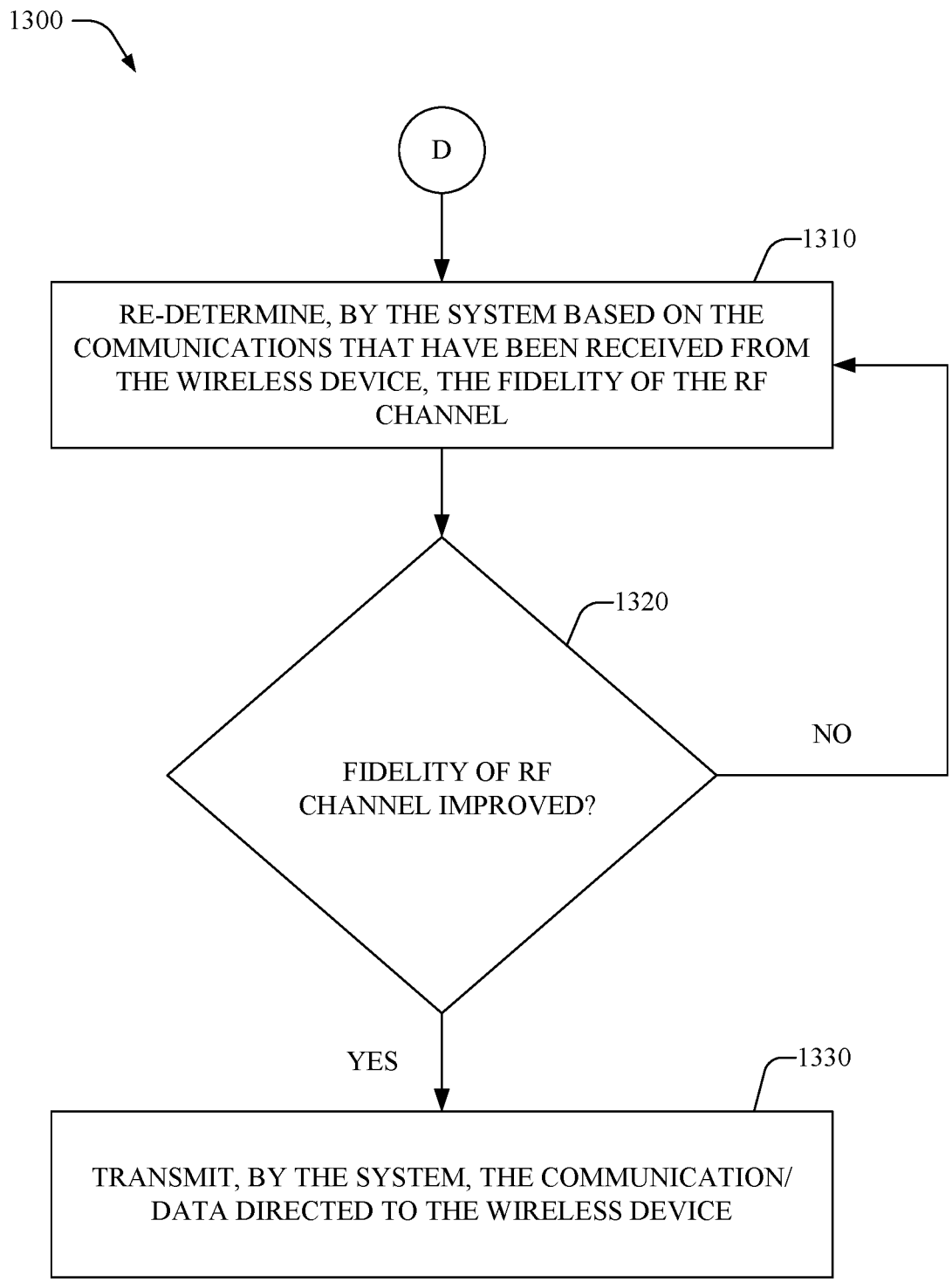

Referring now to FIGS. 8-10, processes 800-1000 performed by an IoT wireless device (e.g., 110) comprising RF fidelity layer 112 are illustrated, in accordance with various example embodiments. At 810, RF fidelity layer 112 can determine a characteristic of an RF channel wirelessly coupling the IoT wireless device to an AP device that has been configured to transmit data that has been received from the IoT wireless device to a host device (e.g., 130) to facilitate further processing of the data by an application (e.g., 242) executing on the host device.

At 820, RF fidelity layer 112 can determine whether the characteristic of the RF channel satisfies a defined condition representing a fidelity of the RF channel has degraded. In turn, if the characteristic of the RF channel has been determined to satisfy the defined condition representing the fidelity of the RF channel has degraded, flow continues to 910, at which RF fidelity layer 112 can determine whether a pending transmission of data has been classified as a critical/urgent/priority transmission; otherwise flow returns to 810.

At 910, in response to a determination that the pending transmission has been classified as a critical/urgent/priority transmission, flow continues from 910 to 920, at which RF fidelity layer 112 can facilitate a transmission, by the IoT wireless device, of the data directed to the host device; otherwise flow continues to 930, at which RF fidelity layer 112 can facilitate a delay, by the IoT wireless device, of a transmission of the data to the host device.

Flow continues from 930 to 1010, at which RF fidelity layer 112 can facilitate a redetermination of the characteristic of the RF channel. From 1010, flow continues to 1020, at which RF fidelity layer 112 can determine whether the characteristic satisfies a defined condition representing that the fidelity of the RF channel has improved. In this regard, in response to a determination that the characteristic satisfies the defined condition representing that the fidelity of the RF channel has improved, flow continues to 1030, at which RF fidelity layer 112 can facilitate a transmission, by the IoT wireless device, of the data directed to the host device; otherwise flow returns to 1010.

FIGS. 11-14 illustrate flowcharts of methods associated with a host system (e.g., 130) comprising RF fidelity component 132, in accordance with various embodiments. At 1110, RF fidelity component 132 can determine, based on communications that have been received from a wireless device (e.g., 110), a fidelity of an RF channel wirelessly coupling the wireless device to an AP device that has been configured to transmit the communications to the system to facilitate further processing of the communications by an application (e.g., 242) executing on the system.

At 1120, RF fidelity component 132 can determine whether a fidelity of the RF channel is degraded. In this regard, in response to a determination that the fidelity of the RF channel is degraded, flow continues to 1210, at which RF fidelity component 132 can determine whether a communication/data that has been received from host application 242 and that is readied for transmission to the wireless device has been classified as a critical/urgent/priority communication/data; otherwise flow returns to 1110.

At 1210, if it is determined that the communication/data that has been received from host application 242 and that is readied for transmission to the wireless device has been classified as the critical/urgent/priority, etc. communication/data, flow continues to 1220, at which RF fidelity component can facilitate a transmission, by the host system, of the communication/data directed to the wireless device; otherwise flow continues to 1230, at which RF fidelity component can facilitate a delay, by the system, of the transmission of the communication/data.

Flow continues from 1230 to 1310, at which RF fidelity component 132 can re-determine, based on the communications that have been received from the wireless device, the fidelity of the RF channel. At 1320, in response to a determination that the fidelity of the RF channel has improved, flow continues to 1330, at which RF fidelity component 132 can facilitate a transmission, by the system, of the communication/data directed to the wireless device; otherwise flow returns to 1310.

Figure 14:
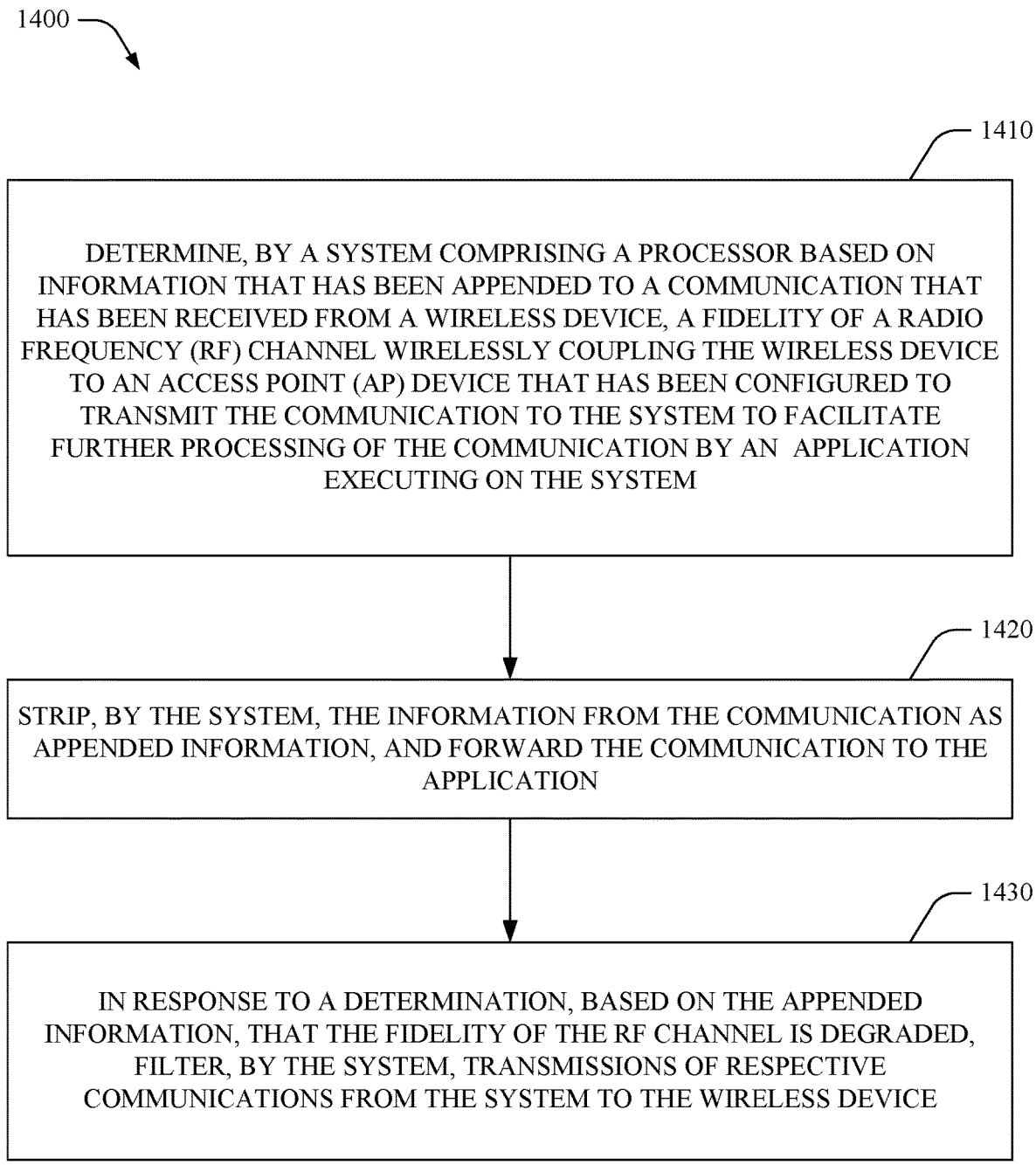

Now referring to FIG. 14, a flowchart of a method associated with a host system (e.g., 130) comprising RF fidelity component 132 for determining a fidelity of an RF channel based on information that has been appended to a communication is illustrated, in accordance with various embodiments. At 1410, RF fidelity component 132 can determine, based on information that has been appended to a communication that has been received from a wireless device (e.g., 110), a fidelity of an RF channel wirelessly coupling the wireless device to an AP device that has been configured to transmit the communication to the system to facilitate further processing of the communication by an application (e.g., 242) that has been executing on the system.

At 1420, RF fidelity component 132 can strip, remove, etc. the information from the communication as appended information, and forward the communication to the application. At 1430, in response to a determination, by RF fidelity component 132 based on the appended information, that the fidelity of the RF channel is degraded, poor, lossy, etc., RF fidelity component 132 can facilitate filtering, delaying, withholding, etc. transmissions of respective communications from the system to the wireless device.

Figure 15:
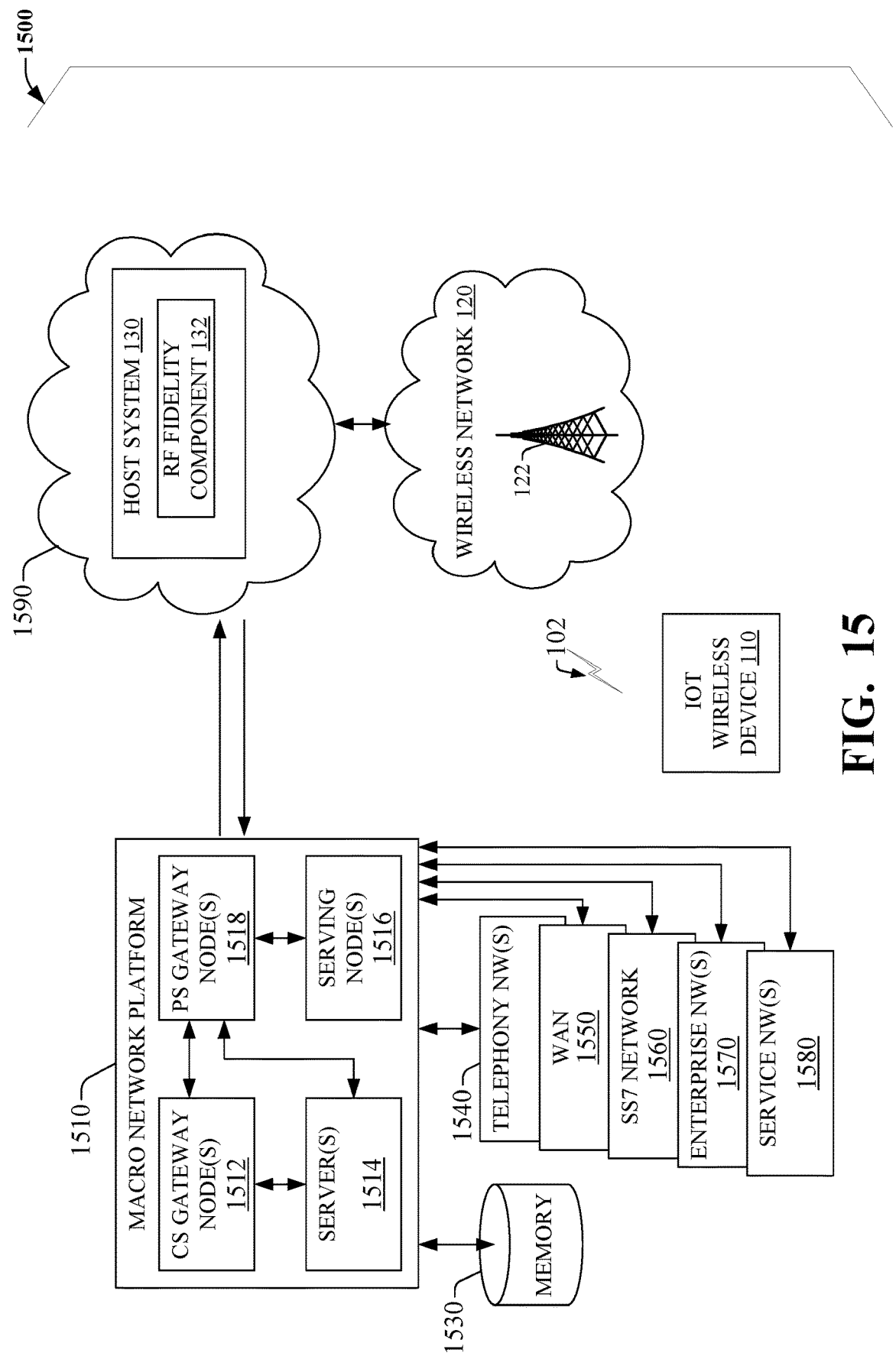
FIG. 15 illustrates a block diagram of a wireless network environment, in accordance various example embodiments.

With respect to FIG. 15, a wireless communication environment 1500 including macro network platform 1510 is illustrated, in accordance with various embodiments. Macro network platform 1510 serves or facilitates communication with an IoT device, sensor, wireless device (e.g., 110) and host system 130 via wireless network 120. It should be appreciated that in cellular wireless technologies, e.g., 3GPP UMTS, high speed packet access (HSPA), 3GPP LTE, third generation partnership project 2 (3GPP2), ultra mobile broadband (UMB), LTE-A, etc. that can be associated with wireless network 120, macro network platform 1510 can be embodied in a core network. It is noted that wireless network 120 can include base station(s) (e.g., 122), base transceiver station(s), access point(s), etc. and associated electronic circuitry and deployment site(s), in addition to a wireless radio link (e.g., 102) operated in accordance with the base station(s), etc. Accordingly, wireless network 120 can comprise various coverage cells, or wireless coverage areas. In addition, it should be appreciated that elements and/or components of host system 130 can be located/included within one or more components/elements, e.g., hardware, software, etc., of wireless communication environment 1500, e.g., macro network platform 1510, cloud-based communication platform 1590, etc.

Generally, macro network platform 1510 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication, e.g., via host system 130. In various embodiments, macro network platform 1510 includes CS gateway (GW) node(s) 1512 that can interface CS traffic received from legacy networks like telephony network(s) 1540, e.g., public switched telephone network (PSTN), public land mobile network (PLMN), Signalling System No. 7 (SS7) network 1560, etc. CS GW node(s) 1512 can authorize and authenticate traffic, e.g., voice, arising from such networks. Additionally, CS GW node(s) 1512 can access mobility or roaming data generated through SS7 network 1560; for instance, mobility data stored in a visitor location register (VLR), which can reside in memory 1530. Moreover, CS GW node(s) 1512 interfaces CS-based traffic and signaling with PS GW node(s) 1518. As an example, in a 3GPP UMTS network, PS GW node(s) 1518 can be embodied in GW general packet radio service (GPRS) support node(s) (GGSN).

As illustrated by FIG. 15, PS GW node(s) 1518 can receive and process CS-switched traffic and signaling via CS GW node(s) 1512. Further PS GW node(s) 1518 can authorize and authenticate PS-based data sessions, e.g., via wireless network 120, with served devices, communication devices, etc. Such data sessions can include traffic exchange with networks external to macro network platform 1510, like wide area network(s) (WANs) 1550; enterprise networks (NWs) 1570, e.g., E911, service NW(s) 1580, e.g., an IP multimedia subsystem (IMS), etc. It should be appreciated that local area network(s) (LANs), which may be a part of enterprise NW(s) 1570, can also be interfaced with macro network platform 1510 through PS GW node(s) 1518. PS GW node(s) 1518 can generate packet data contexts when a data session is established, e.g., associated with an EPS bearer context activation. To that end, in an aspect, PS GW node(s) 1518 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1514. It is to be noted that in 3GPP UMTS network(s), PS GW node(s) 1518 (e.g., GGSN) and tunnel interface (e.g., TTG) comprise a packet data GW (PDG).

Macro network platform 1510 also includes serving node(s) 1516 that can convey the various packetized flows of information, or data streams, received through PS GW node(s) 1518. As an example, in a 3GPP UMTS network, serving node(s) can be embodied in serving GPRS support node(s) (SGSN).

As indicated above, server(s) 1514 in macro network platform 1510 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1510. Data streams can be conveyed to PS GW node(s) 1518 for authorization/authentication and initiation of a data session, and to serving node(s) 1516 for communication thereafter. Server(s) 1514 can also effect security, e.g., implement one or more firewalls, of macro network platform 1510 to ensure network's operation and data integrity in addition to authorization and authentication procedures that CS GW node(s) 1512 and PS GW node(s) 1518 can enact. Moreover, server(s) 1514 can provision services from external network(s), e.g., WAN 1550, or global positioning system (GPS) network(s), which can be a part of enterprise NW(s) 1580. It is to be noted that server(s) 1514 can include one or more processors configured to confer at least in part the functionality of macro network platform 1510. To that end, the one or more processors can execute code instructions stored in memory 1530, for example.

In wireless communication environment 1500, memory 1530 can store information related to operation of macro network platform 1510, e.g., related to operation of IoT wireless device 110, host system 130, etc. The information can include business data associated with subscribers; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via wireless network 120; and so forth. Memory 1530 can also store information from at least one of telephony network(s) 1540, WAN 1550, SS7 network 1560, enterprise NW(s) 1570, or service NW(s) 1580.

In one or more embodiments, components of core network environment 1500 can provide, e.g., via cloud-based communication platform 1590, communication services to IoT wireless device 110 and host system 130 utilizing an over-the-air wireless link, e.g., 102, via wireless network 120. In this regard, wireless network 120 can include one or more: macro, Femto, or pico access points (APs) (not shown); base stations (BS) (not shown); landline networks (e.g., optical landline networks, electrical landline networks) (not shown) communicatively coupled between IoT wireless device 110 and macro network platform 1510.

Core network environment 1500 can include one or more of the Internet (or another communication network (e.g., IP-based network)), or DSL-type or broadband network facilitated by Ethernet or other technology. In various embodiments, core network environment 1500 can include hardware and/or software for allocating resources to IoT wireless device 110 and host system 130, converting or enforcing protocols, establishing and/or providing levels of quality of service (QoS), providing applications or services, translating signals, and/or performing other desired functions to facilitate system interoperability and communication to/from IoT wireless device 110 and host system 130.

In other embodiment(s), core network environment 1500 can include data store component(s), a memory configured to store information, computer-readable storage media storing computer-executable instructions, e.g., memory 1530, etc. enabling various operations performed via host system 130 as described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "memory storage," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in non-volatile memory 1622 (see below), disk storage 1624 (see below), and/or memory storage 1646 (see below). Further, nonvolatile memory can be included in read only memory (ROM), programmable ROM (PROM), electrically programmable ROM (EPROM), electrically erasable ROM (EEPROM), or flash memory. Volatile memory 1620 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 16:
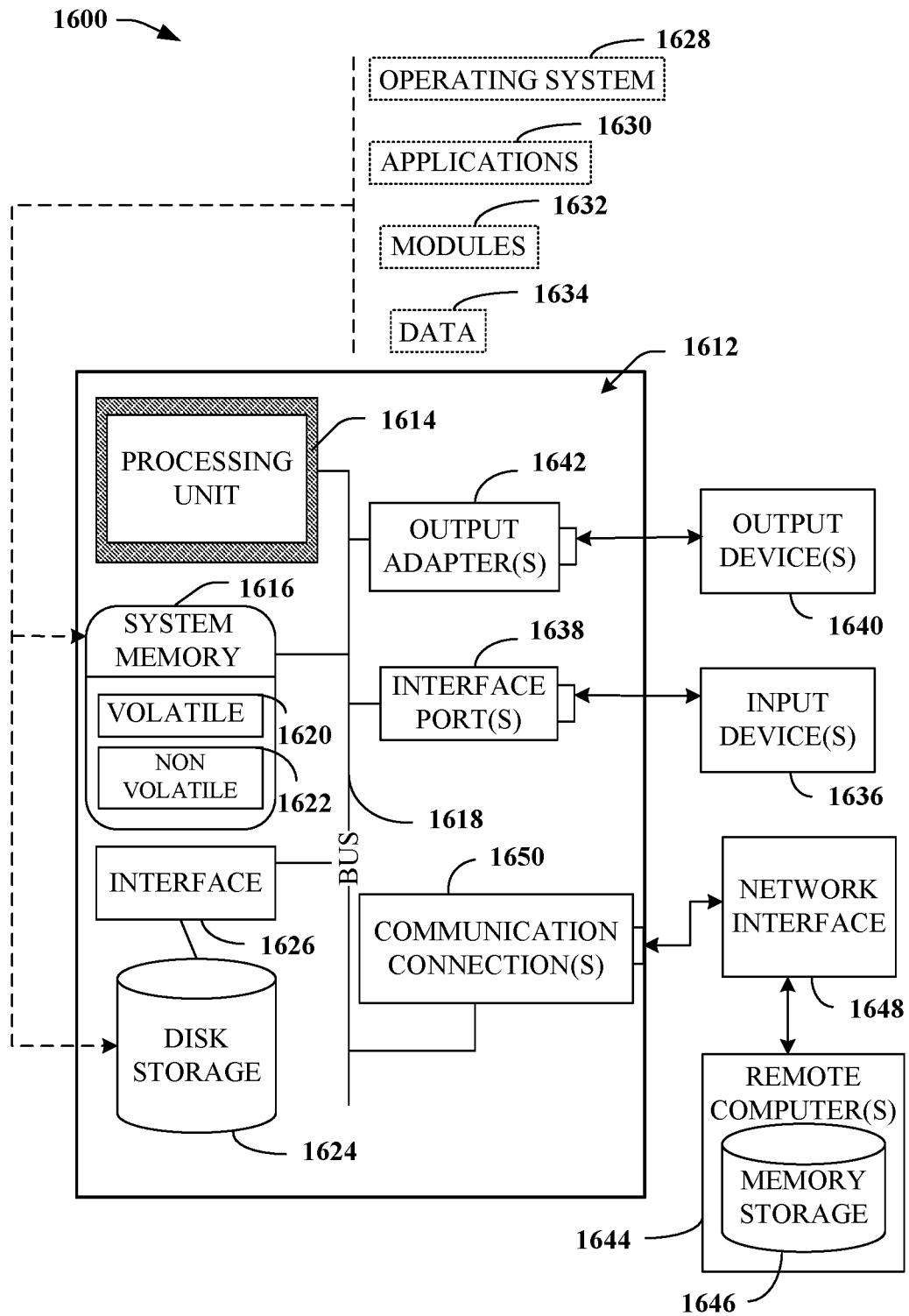
FIG. 16 is a block diagram representing an illustrative non-limiting computing system or operating environment in which one or more aspects of various embodiments described herein can be implemented.

In order to provide a context for the various aspects of the disclosed subject matter, FIG. 16, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 16, a block diagram of a computing system 1600 operable to execute the disclosed systems and methods is illustrated, in accordance with an embodiment. Computer 1612 includes a processing unit 1614, a system memory 1616, and a system bus 1618. System bus 1618 couples system components including, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) including a memory bus or a memory controller, a peripheral bus or an external bus, and/or a local bus using any variety of available bus architectures including, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1616 includes volatile memory 1620 and nonvolatile memory 1622. A basic input/output system (BIOS), containing routines to transfer information between elements within computer 1612, such as during start-up, can be stored in nonvolatile memory 1622. By way of illustration, and not limitation, nonvolatile memory 1622 can include ROM, PROM, EPROM, EEPROM, or flash memory. Volatile memory 1620 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1612 also includes removable/non-removable, volatile/non-volatile computer storage media. FIG. 16 illustrates, for example, disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to system bus 1618, a removable or non-removable interface is typically used, such as interface 1626.

It is to be appreciated that FIG. 16 describes software that acts as an intermediary between users and computer resources described in suitable operating environment 1600. Such software includes an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be appreciated that the disclosed subject matter can be implemented with various operating systems or combinations of operating systems.

A user can enter commands or information into computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1614 through system bus 1618 via interface port(s) 1638. Interface port(s) 1638 include, for example, a serial port, a parallel port, a game port, a universal serial bus (USB), a wireless based port, e.g., WiFi, Bluetooth, etc. Output device(s) 1640 use some of the same type of ports as input device(s) 1636.

Thus, for example, a USB port can be used to provide input to computer 1612 and to output information from computer 1612 to an output device 1640. Output adapter 1642 is provided to illustrate that there are some output devices 1640, like display devices, light projection devices, monitors, speakers, and printers, among other output devices 1640, which use special adapters. Output adapters 1642 include, by way of illustration and not limitation, video and sound devices, cards, etc. that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, a workstation, a microprocessor based appliance, a peer device, or other common network node and the like, and typically includes many or all of the elements described relative to computer 1612.

For purposes of brevity, only a memory storage device 1646 is illustrated with remote computer(s) 1644. Remote computer(s) 1644 is logically connected to computer 1612 through a network interface 1648 and then physically and/or wirelessly connected via communication connection 1650. Network interface 1648 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit-switching networks like integrated services digital networks (e.g., ISDN) and variations thereon, packet switching networks, and digital subscriber lines (DSL).

Communication connection(s) 1650 refer(s) to hardware/software employed to connect network interface 1648 to bus 1618. While communication connection 1650 is shown for illustrative clarity inside computer 1612, it can also be external to computer 1612. The hardware/software for connection to network interface 1648 can include, for example, internal and external technologies such as modems, including regular telephone grade modems, cable modems and DSL modems, wireless modems, ISDN adapters, and Ethernet cards.

The computer 1612 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1612 can connect to other devices/networks by way of antenna, port, network interface adaptor, wireless access point, modem, and/or the like.

The computer 1612 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), $x^{th}$ generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., UE, and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a network aware data driven IoT communication environment (see e.g., 100, 200, etc.), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless system e.g., a wireless communication device, UE 1002, etc. for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, via policy rules of a policy framework, etc. as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module. Thus, the classifier(s) can be used by an artificial intelligence system to automatically learn and perform a number of functions, e.g., performed by a wireless device (e.g., 110), including but not limited to: creating an RF fidelity layer within an upper portion of a protocol stack of the wireless device; monitoring, via the RF fidelity layer, a characteristic of an RF link between the wireless device and an AP device; and in response to the characteristic of the RF link being determined to satisfy a defined condition representing that a fidelity of the RF link is lossy, preempting, via the RF fidelity layer, a transmission of data from the wireless device to a host device to facilitate a reduction in transmission control protocol based retransmissions of the data occurring under lossy condition(s) of the RF link.

A classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
based on a first determined classification of incoming data that has been received from a wireless device, determining, by a system comprising a processor, a characteristic of a radio frequency channel wirelessly coupling the wireless device to an access point device that has been configured to transfer the incoming data from the wireless device to the system; and
in response to the characteristic of the radio frequency channel being determined to satisfy a defined condition representing a degradation of a fidelity of the radio frequency channel, modifying, by the system based on a second determined classification of outbound data that has been directed to the wireless device, a transmission of the outbound data to facilitate a reduction in wireless retransmissions of the outbound data due to the degradation of the fidelity of the radio frequency channel.

2. The method of claim 1, wherein the determining of the characteristic comprises:
determining the characteristic based on appended information representing the fidelity of the radio frequency channel that has been appended to the incoming data.

3. The method of claim 1, wherein the modifying of the transmission of the outbound data comprises:
in response to the outbound data being determined to comprise a non-urgent type of communication, withholding the transmission of the non-urgent type of communication.

4. The method of claim 3, wherein the withholding of the transmission of the outbound data comprises:
storing the non-urgent type of communication in a first-in-first-out buffer as stored data to facilitate a delayed transmission of the non-urgent type of communication.

5. The method of claim 4, wherein the defined condition comprises a first defined condition, and wherein the operations further comprise:
in response to the characteristic of the radio frequency channel being determined to satisfy a second defined condition representing the fidelity of the radio frequency channel has improved, sending the non-urgent type of communication directed to the wireless device.

6. The method of claim 3, wherein the modifying of the transmission of the outbound data comprises:
in response to the outbound data being determined to comprise an urgent type of communication, sending the urgent type of communication directed to the wireless device.

7. The method of claim 1, wherein the modifying the transmission of the outbound data comprises:
enabling transmissions of priority data to the wireless device.

8. A system, comprising:
a processor; and
a memory that stores executable instructions that, when executed by the processor, facilitate performance of operations, comprising:
based on a classification of incoming data that has been received from a wireless device, determining a characteristic of a radio frequency channel wirelessly coupling the wireless device to an access point device that has been configured to transfer data, comprising the incoming data, between the wireless device and the system; and
in response to the characteristic of the radio frequency channel being determined to satisfy a defined condition representing a degradation of a fidelity of the radio frequency channel, modifying, based on a priority level of an outgoing portion of the data, a transmission of the outgoing portion from the system to the wireless device, the transmission to facilitate a reduction of wireless retransmissions of the outgoing portion due to the degradation of the fidelity of the radio frequency channel.

9. The system of claim 8, wherein the defined condition comprises a first defined condition, wherein the outgoing portion of the data comprises a non-priority communication, and wherein the modifying the transmission of the outgoing portion of the data comprises:
in response to the classification of the incoming data being determined to satisfy a second defined condition with respect to an amount of priority communications that have been received during a defined period of time, delaying the transmission of the non-priority communication.

10. The system of claim 9, wherein the operations further comprise:
in response to the characteristic of the radio frequency channel being determined to satisfy a third defined condition representing an improvement of the fidelity of the radio frequency channel, sending the non-priority communication directed to the wireless device.

11. The system of claim 8, wherein the defined condition comprises a first defined condition, wherein the outgoing portion of the data comprises a non-priority communication, and wherein the modifying the transmission of the outgoing portion of the data comprises:
in response to the classification of the incoming data being determined to satisfy a second defined condition with respect to an amount of non-priority communications that have been received during a defined period of time, sending the non-priority communication directed to wireless device.

12. The system of claim 8, wherein the defined condition comprises a first defined condition, wherein the outgoing portion of the data comprises a priority communication, and wherein the modifying the transmission of the outgoing portion of the data comprises:
in response to the classification of the incoming data being determined to satisfy a second defined condition with respect to an amount of priority communications that have been received during a defined period of time, sending the priority communication directed to wireless device.

13. The system of claim 8, wherein the determining the characteristic comprises:
determining the characteristic of the radio frequency channel based on appended information representing the fidelity of the radio frequency channel that has been appended to the incoming data.

14. The system of claim 13, wherein a host application comprises the executable instructions, and wherein the operations further comprises:
removing the appended information from the incoming data to obtain application data; and
forwarding the application data to the host application to facilitate further processing of the application data.

15. The system of claim 13, wherein the outgoing portion of the data comprises a non-priority communication, and wherein the modifying the transmission of the outgoing portion of the data comprises:

in response to determining, based on the appended information, that the characteristic of the radio frequency channel satisfies the defined condition representing the degradation of the fidelity of the radio frequency channel, delaying the transmission of the non-priority communication.

16. The system of claim 13, wherein the outgoing portion of the data comprises a priority communication, and wherein the modifying the transmission of the outgoing portion of the data comprises:

in response to determining, based on the appended information, that the characteristic of the radio frequency channel satisfies the defined condition representing the degradation of the fidelity of the radio frequency channel, sending the priority communication directed to the wireless device.

17. A non-transitory machine-readable storage medium, comprising executable instructions that, when executed by a processor of a host device, facilitate performance of operations, comprising:

monitoring a characteristic of a radio frequency link between a wireless device and an access point device; and in response to the characteristic of the radio frequency link being determined, based on a defined classification of incoming data that has been received from the wireless device, to satisfy a defined condition representing that a fidelity of the radio frequency link is lossy, preempting a transmission of outgoing data from the host device to the wireless device to facilitate a reduction in transmission control protocol based retransmissions of the outgoing data occurring under a lossy condition of the radio frequency link.

18. The non-transitory machine-readable storage medium of claim 17, wherein the monitoring of the characteristic comprises:

monitoring the characteristic of the radio frequency link corresponding to a data channel between the wireless device and the access point device.

19. The non-transitory machine-readable storage medium of claim 17, wherein the outgoing data comprises a non-urgent communication, and wherein the preempting the transmission comprises:

delaying a transmission of the non-urgent communication.

20. The non-transitory machine-readable storage medium of claim 17, wherein the operations further comprise:

determining the characteristic of the radio frequency link based on appended information representing the fidelity of the radio frequency link that has been appended to the incoming data.

* * * * *